(12) United States Patent
Hedy

(10) Patent No.: US 7,133,935 B2
(45) Date of Patent: Nov. 7, 2006

(54) SYSTEM AND METHOD FOR REAL-TIME ELECTRONIC INQUIRY, DELIVERY, AND REPORTING OF CREDIT INFORMATION

(76) Inventor: Shad Hedy, 13633 Queens Harbor BV N., Jacksonville, FL (US) 32225

( * ) Notice: Subject to any disclaimer, the term of this patent is extended or adjusted under 35 U.S.C. 154(b) by 252 days.

(21) Appl. No.: 10/704,289

(22) Filed: Nov. 7, 2003

(65) Prior Publication Data

US 2004/0133521 A1    Jul. 8, 2004

Related U.S. Application Data

(63) Continuation-in-part of application No. 09/420,885, filed on Oct. 19, 1999, now Pat. No. 6,988,085.

(51) Int. Cl.
*G06F 15/16* (2006.01)

(52) U.S. Cl. ............... 709/250; 705/1; 705/14; 705/26; 705/35; 705/36; 705/37; 705/38; 705/39; 705/40; 705/44; 709/217; 709/223; 235/375; 235/379; 235/380; 707/3; 707/10

(58) Field of Classification Search .......... 705/1, 705/14, 26, 35–40, 44; 709/217, 230; 235/375, 235/379, 380; 707/3, 10
See application file for complete search history.

(56) References Cited

U.S. PATENT DOCUMENTS 5,274,547 A * 12/1993 Zoffel et al. ............ 705/38
5,857,191 A *  1/1999 Blackwell, Jr. et al. ..... 707/10
6,988,085 B1 * 1/2006 Hedy .................. 705/51

2001/0011245 A1 * 8/2001 Duhon .................... 705/38

FOREIGN PATENT DOCUMENTS

CA          2424177 A1 * 10/2004

OTHER PUBLICATIONS

Equifax. Jun. 3, 1999. http://www.equifax.com/consumer/faqs/credit/security.html. Retreived from IDS.*
O'Harrow, Robert Jr. and Chandrasekaran, Rajiv. Credit Reports Made Available Online. Aug. 15, 1997. The Washington Post; p. D01. Retrieved online.*

* cited by examiner

*Primary Examiner*—James A Reagan

(57) ABSTRACT

A system and method for providing electronic inquiry, delivery, and reporting of personal credit information to and from credit bureaus, via the Internet. In the preferred embodiment, the system includes a web site that, by using a web browser, allows clients to request credit information from, or provide credit reports to, credit bureaus by entering certain data on pre-built forms in a web browser-supported format. The data is encrypted using means for secure transmission, such as a web browser with at least a 128-bit secure socket layer (SSL) technology, and then sent to at least one web application executed by web server software. The web server software decrypts and reformats the data to a standard format specified by the credit bureau. The web server software initiates a query. The at least one web applications reformat the response from the credit bureau to a web browser-supported format and encrypt the data using the means for secure transmission. The web browser-supported formatted data is then sent back to the client's computer over the Internet and displayed on the client's web browser in an easily read format.

4 Claims, 25 Drawing Sheets

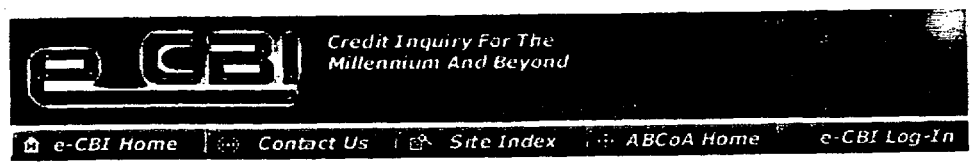
Electronic Credit Bureau Inquiry
About e-CBI
Take A Tour
Sign Up Now
  F. A. Q.
[ e-CBI Home ] [ Contact Us ] [ About e-CBI ] [ Take a Tour ] [ Sign Up Now ] [ F.A.Q ] [ e-CBI Log-In ]
© 2003 Advanced Business Computers of America. All rights reserved.
Legal Disclaimer
FIG. 3

Credit Inquiry For The Millennium And Beyond

| Company ID: | |
| --- | --- |
| User Logon: | |
| User Pass: | |

[Login] [Reset]

| e-CBI Database Access | About e-CBI Security | e-CBI Help Manual | Help! I Forgot My ... |

| SERVER STATISTICS | | CLIENT STATISTICS | |
| --- | --- | --- | --- |
| Server Cipher Keysize | 128 | Client Cipher Keysize | 128 |
| Secure Status | HTTPS is active | Client Browser & Ver. | Internet Explorer 4 |
| SSL Protocol | SSLv3 | Client Platform | Windows NT |
| Server Date | October 24, 2003 | Client Date | October 24, 2003 |
| Server Time | 10:47 A.M. EST | Client Time | 10:55 A.M. MST |
| Server Timezone | Eastern Standard Time | Client Timezone | Mountain Standard Time |
| Server Type & Ver. | Apache/1.3.27 (Unix | Client Domain | 0.100 |
| Server Host & Port | www.e-cbi.com 443 | Client IP Address | 192.168.0.100 |

[ e-CBI Home ][ About e-CBI ][ Take a Tour ][ Sign Up Now ][ F.A.Q ][ About Security ][ Help, I Forgot My... ]

© 2003 Advanced Business Computers of America. All rights reserved.
Legal Disclaimer

FIG. 4

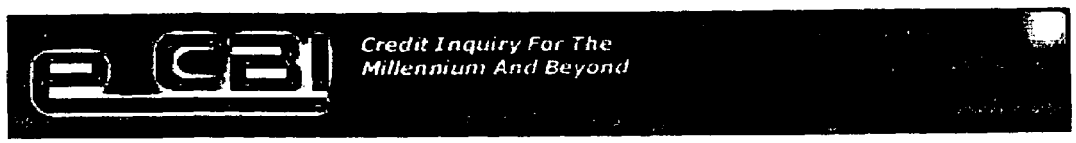

| | |
|---|---|
| First Name: | John |
| Middle Name or Initial: | Q |
| Last Name: | Cconsumer |
| Social Security Number: | 16524799 |
| Apartment Number: | |
| House Number: | 1600 |
| Street Name: | PO Box |
| City: | Oz |
| State/Province: | Georgia |
| Zip/Postal Code: | 00999 |
| Inquiry Type: | ◉ Individual ○ Joint |
| Spouse's First Name: | |
| Spouse's Last Name: | |
| Spouse's Social Security Number: | |
| Optional Features: | ☐ Online Directory ☐ Beacon |
| PIN: (Override Security Freeze) | |

[ Get Report ] [ Clear Form ]   ◉ Enhanced ○ Classic   ☐ Page Breaks

My e-CBI
Exit e-CBI

[Back to Inquiry Form]  [Experian]  [Trans Union]  [My e-CBI]
[Save Report]

Equifax Credit Report For COONSUMER, JOHN

Date Report Retrieved: October 24, 2003  Time Report Retrieved: 10:54 A.M. EST
| IDENTIFICATION | SUMMARY OF FILE ITEMS | PUBLIC RECORDS | CONSUMER STATEMENTS | FOREIGN INQUIRIES | INQUIRIES | TRADES
| ONLINE DIR |

CONSUMER IDENTIFICATION   >>>GO TO TOP<<<

| | | | |
|---|---|---|---|
| Subject Name: | COONSUMER, JOHN | Date File Was Established (SINCE): | AUGUST 21, 2002 |
| Former Name (AKA): | CCONSUMER, JOHN | Date Of Last Activity On File (FAD): | OCTOBER 24, 2003 |
| Social Security Number: | | Social Security Number Is Verified: | NO |
| Date Of Birth: | JANUARY 01, 1980 | Date Of Death: | |

ADDRESSES

| | Current | Former | Second Former |
|---|---|---|---|
| Address: | PO BOX 1600<br>OZ, GA 30221 | B 1600 PO<br>OZ, GA 00999 | |
| Residence Since: | | | |
| Rent/Own/Buy: | | | |
| Date Reported: | AUGUST, 2002 | APRIL, 2003 | |
| Source: | CRT | DAT | |

TELEPHONE

| | Current | Former | Second Former |
|---|---|---|---|
| Phone Number: | | | |
| Date Reported: | | | |
| Source: | | | |

EMPLOYMENT

| | Current | Former | Second Former |
|---|---|---|---|
| Position: | | | |
| Firm: | | | |
| Location: | | | |
| Date Employed: | | | |
| Date Verified: | | | |
| Date Left: | | | |

SUMMARY OF FILE ITEMS   >>>GO TO TOP<<<

IMPORTANT NOTES
>>> Subject Shows 26 Inquiries Since July 24, 2003
Safescan Warning: Inquiry Address Has Been Associated With More Than One Name Or Social Security Number.
Thorough Verification Suggested.

| | | | |
|---|---|---|---|
| Oldest Inquiry Date On Subject: | AUGUST 21, 2002 | Newest Inquiry Date On Subject: | OCTOBER 24, 2003 |
| Oldest Opening Date Of Trade: | | Newest Reporting Date Of Trade: | |
| File Has Public Records: | NO | High Credit Range: | $0 - $0 |
| Total Inquiries: | 29 | Total Foreign Inquiries: | 2 |
| Total Trade Lines (Accounts): | 0 | Total Debt On All Accounts: | $0 |
| Fraud Victim Indicator: | | | |

TOTAL NUMBER OF PUBLIC RECORD ENTRIES: 0

| | |
|---|---|
| Total Number Of Bankruptcies: | 0 Total Number Of Collections: 0 |
| Total Number Of Financing Statements: | 0 Total Number Of Legal Items: 0 |
| Total Number Of Foreclosures: | 0 Total Number Of Tax Liens: 0 |
| Total Number Of Financial Counselings: | 0 Total Number Of Garnishments: 0 |

TOTAL NUMBER OF ACCOUNTS PER RATE (MANNER OF PAYMENTS)

| RATE OF | | | | | | | | | |
|---|---|---|---|---|---|---|---|---|---|
| 0 | 1 | 2 | 3 | 4 | 5 | 6 (*) | | 7 | 8 | 9 |
| 0 | 0 | 0 | 0 | 0 | 0 | 0 | | 0 | 0 | 0 |

TOTAL NUMBER OF ACCOUNTS PER STATUS CODE

| STATUS CODE OF | | | | | | | | | | | | | | | | | | | | |
|---|---|---|---|---|---|---|---|---|---|---|---|---|---|---|---|---|---|---|---|---|
| A | B | C | D | E | F | G | H | J | K | L | M | N | Q | S | T | U | V | W | X | Z | # | $ |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

TOTAL NUMBER OF ACCOUNTS PER TYPE

| Installment Accounts | Revolving Or Option Accounts | Open Accounts |
|---|---|---|

FIG. 11a

| TOTAL NUMBER OF ACCOUNTS PAST DUE: 0 | | |
|---|---|---|
| 30 Days Late | 60 Days Late | 90 Days Late Or More |
| 0 | 0 | 0 |

Beacon Score Option Not Selected

PUBLIC RECORDS OR OTHER INFORMATION  >>>GO TO TOP<<<

BANKRUPTCIES

| Date Filed | Court # | Case # | Liabilities | Assets | Exmt Amnt | Filer | Type | Intent-Chapter # |
|---|---|---|---|---|---|---|---|---|

COLLECTIONS

| Reported | Assigned | Agcy. Cust # | Agency's Client | Amnt. | Baln. | D L A | A D C | Acct. Num. |
|---|---|---|---|---|---|---|---|---|

FINANCING STATEMENTS

| Date Filed | Court Customer Number | Case Number | Maturity Date | Creditor (Industry Code) |
|---|---|---|---|---|

LEGAL ITEMS

| Legal Type | Filed | Court # | Amnt. | Defendant | Case # | Plaintiff | Verified | Status | Satisfied |
|---|---|---|---|---|---|---|---|---|---|

FORECLOSURES

| Date Reported | Date Checked | Customer Number (or Narrative) |
|---|---|---|

TAX LIENS

| Date Filed | Court Number | Case Number | Amount | Date Released | Date Verified | Creditor Class (Industry Code) |
|---|---|---|---|---|---|---|

FINANCIAL COUNSELINGS

| Date Reported | Court Number | Amount | Date Checked | Date Settled | Status |
|---|---|---|---|---|---|

GARNISHMENTS

| Reported | Court # | Case # | Amount | Checked | Satisfied | Plaintiff | Garnishee | Defendant |
|---|---|---|---|---|---|---|---|---|

CONSUMER STATEMENTS  >>>GO TO TOP<<<

| Date Reported | Purge Date | Consumer Verbiage |
|---|---|---|

FILE INQUIRIES  >>>GO TO TOP<<<

| # | Date | Inquiry | Customer Number | Description |
|---|---|---|---|---|
| 1 | JUNE 17, 2003 | CR 650ZB | 09547 | NTN |
| 2 | MARCH 27, 2003 | CR 152ZB | 01863 | TNT |

INQUIRIES  >>>GO TO TOP<<<

| # | Customer Name | Customer # | Date Inquired | # | Customer Name | Customer # | Date Inquired |
|---|---|---|---|---|---|---|---|
| 1 | VILLALBACR | 746FC00273 | OCTOBER 24, 2003 | 2 | BRDMR GRP | 615ZZ03159 | OCTOBER 24, 2003 |
| 3 | CHARLIECAR | 479AN00165 | OCTOBER 23, 2003 | 4 | MENDOZAFIN | 479FP01178 | OCTOBER 23, 2003 |
| 5 | MENDOZA123 | 746HF00326 | OCTOBER 23, 2003 | 6 | COOP.UTUAD | 746FC00369 | OCTOBER 23, 2003 |
| 7 | MENDOZAFIN | 479FP00238 | OCTOBER 22, 2003 | 8 | COOP-RROAD | 479FC01222 | OCTOBER 22, 2003 |
| 9 | COOPR ROAD | 746FC00059 | OCTOBER 22, 2003 | 10 | MENDOZAFIN | 746FP00253 | OCTOBER 22, 2003 |
| 11 | COOP/A.BUE | 479FC01156 | OCTOBER 21, 2003 | 12 | COOP/MAUNA | 746FC00548 | OCTOBER 20, 2003 |
| 13 | COOPR ROAD | 746FC00059 | OCTOBER 20, 2003 | 14 | MAUNACOOP | 479FC00760 | OCTOBER 17, 2003 |
| 15 | PHIL-CRE-U | 746FC00307 | OCTOBER 17, 2003 | 16 | COOP-RROAD | 479FC01214 | OCTOBER 17, 2003 |
| 17 | COOPBACARD | 746FC00281 | OCTOBER 16, 2003 | 18 | COOP-RDZHI | 479FC01370 | OCTOBER 16, 2003 |
| 19 | COOPLAJAS | 746FC00356 | OCTOBER 16, 2003 | 20 | DSFCU | 152FC12542 | OCTOBER 16, 2003 |
| 21 | COOP/MAUNA | 746FC00548 | OCTOBER 15, 2003 | 22 | DSFCU | 152FC12542 | OCTOBER 15, 2003 |
| 23 | COOPR ROAD | 746FC00059 | OCTOBER 15, 2003 | 24 | COOPR ROAD | 746FC00059 | OCTOBER 10, 2003 |

FIG. 11b

| 25 | DSFCU | 152FC12542 | OCTOBER 06, 2003 | 26 | DSFCU | 152FC12542 | SEPTEMBER 02, 2003 |
| 27 | LEGACY FCU | 133FC02639 | APRIL 23, 2003 | 28 | CCSOFNEXA | 6122Z216360 | FEBRUARY 27, 2003 |
| 29 | YAK VAL CU | 711FC74020 | AUGUST 21, 2002 | | | | |

TRADES   >>>GO TO TOP<<<

| Customer Name | Customer Number | Date Rptd | Date Opnd | H C | Terms | Bal. | Past Due | T/R/S Code | Mon Rev | ADC | Account Number | 30 | 60 | 90 | DLA | Account Status |
|---|---|---|---|---|---|---|---|---|---|---|---|---|---|---|---|---|

ONLINE DIRECTORY   >>>GO TO TOP<<<

| Customer Name | Customer Number | Telephone | Customer Address, City, State & ZIP |
|---|---|---|---|

Online Directory Option Not Selected

[Back to Inquiry Form]     [Save Report]     [My e-CBI]

FIG. 11c

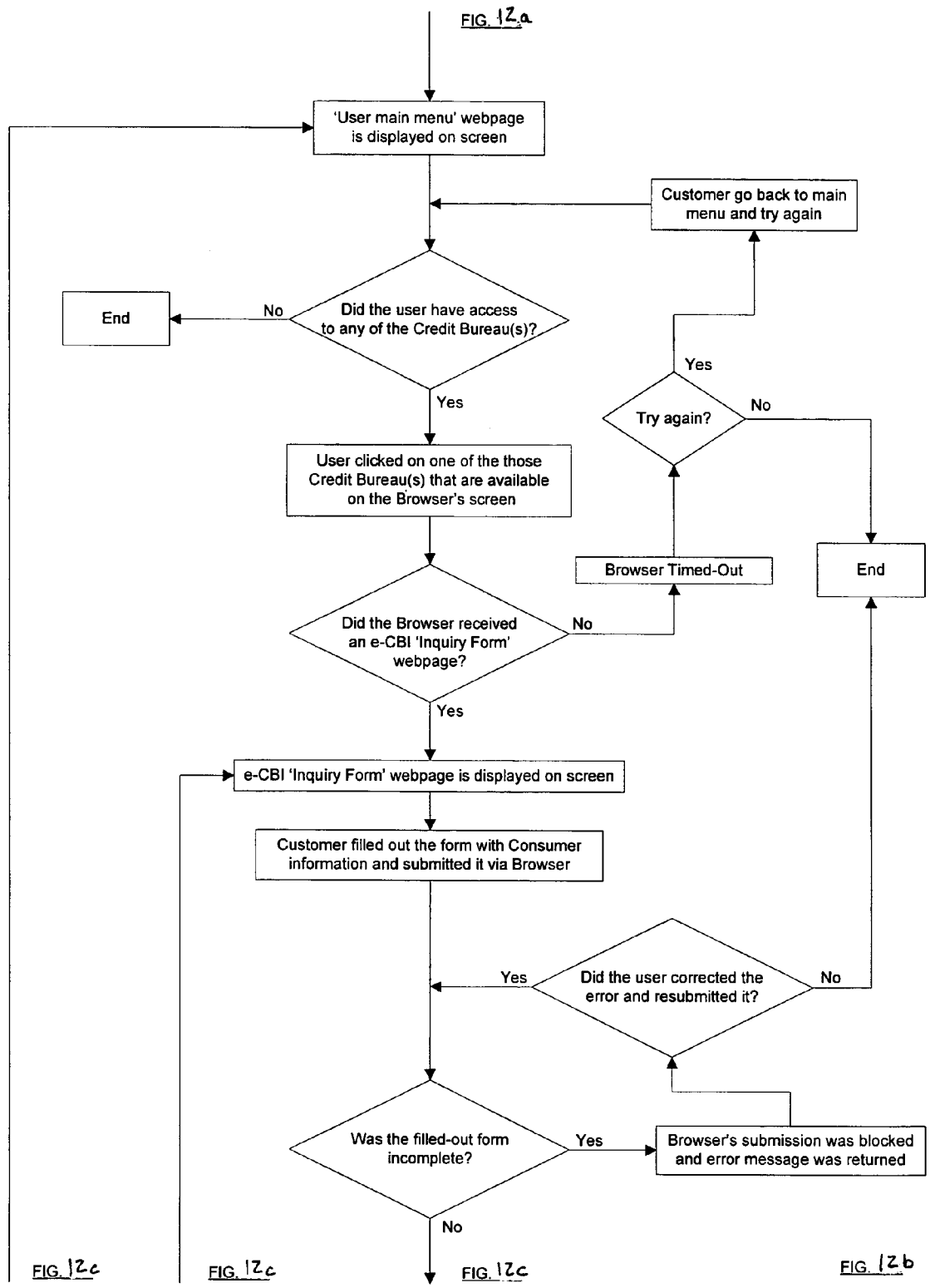

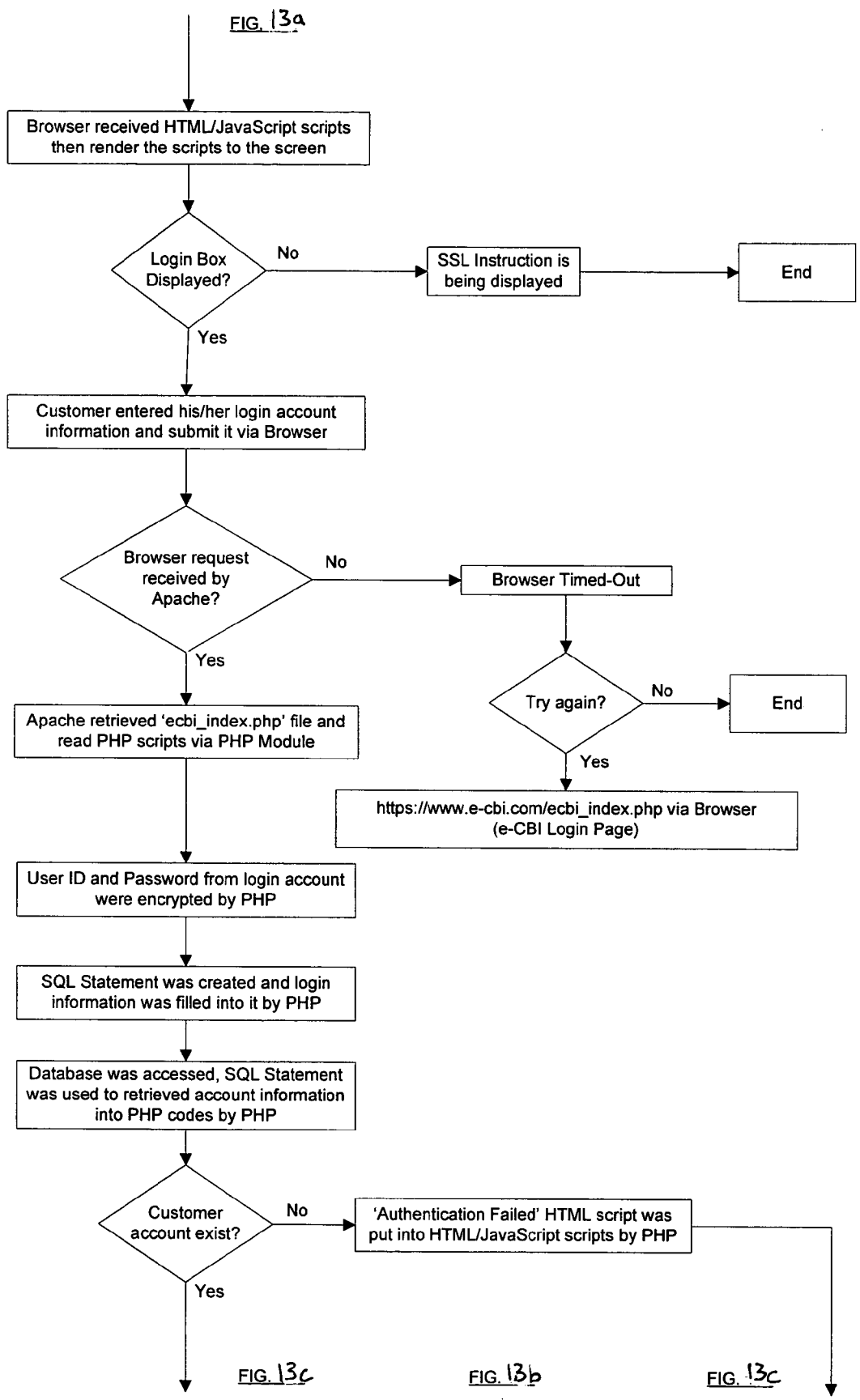

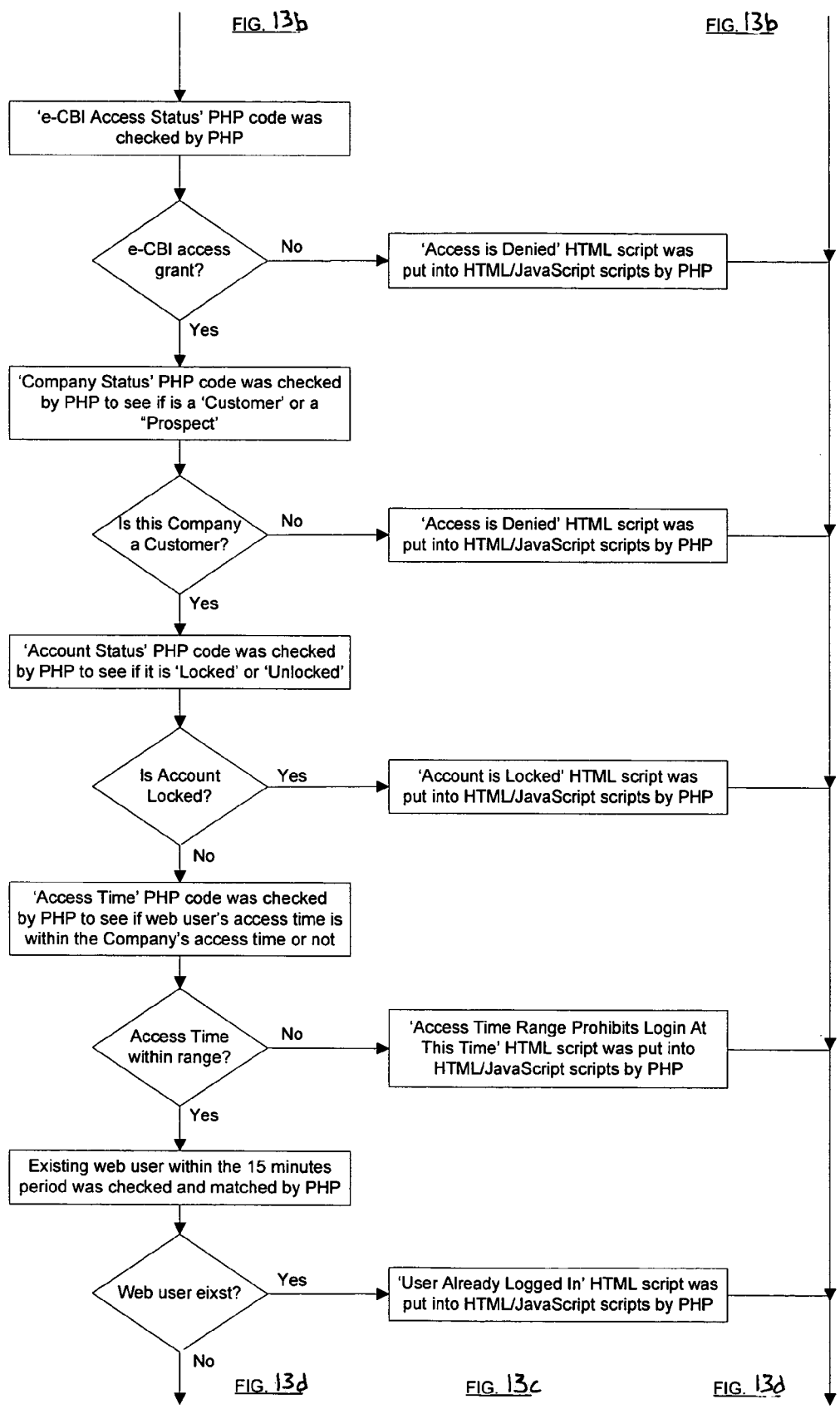

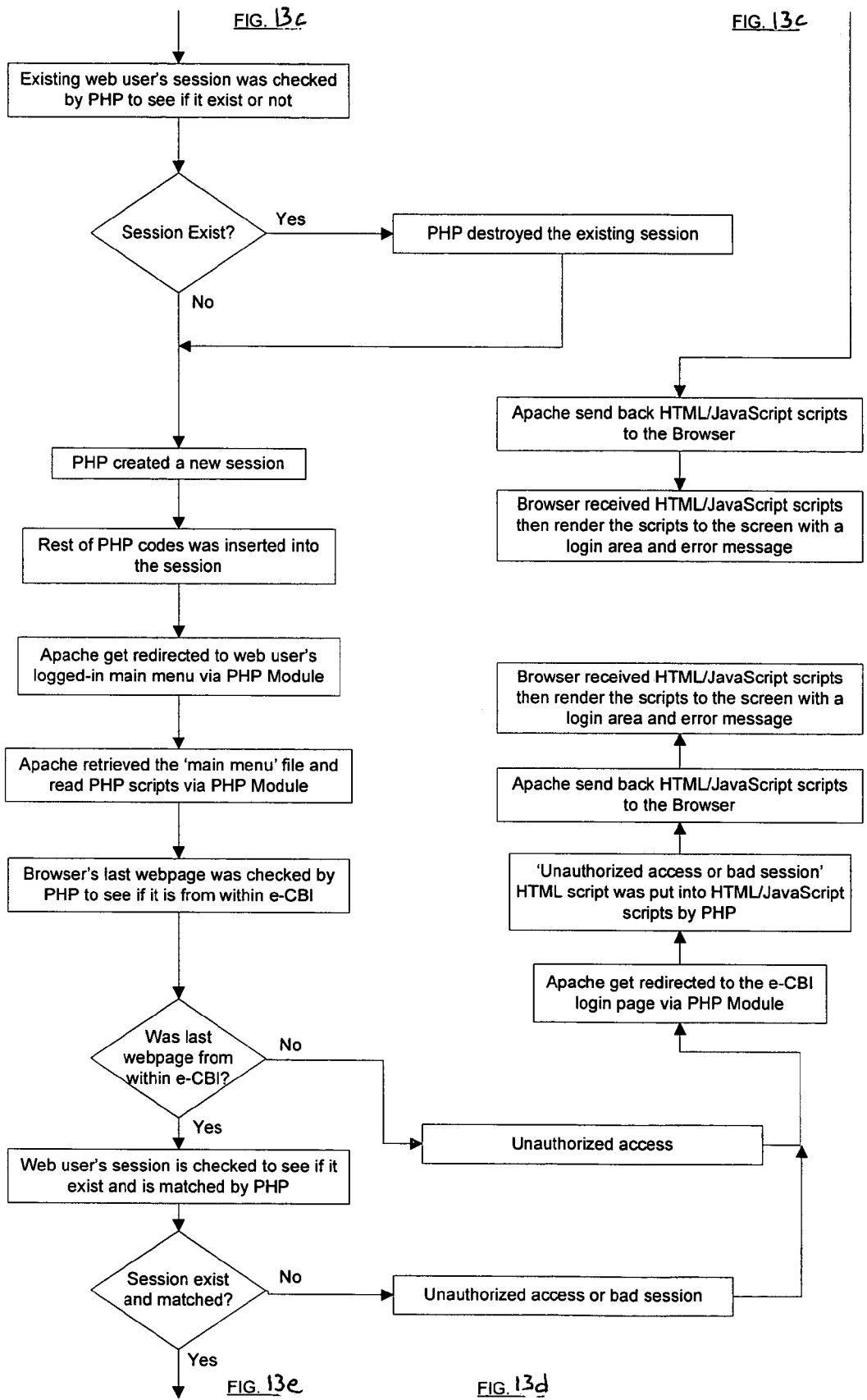

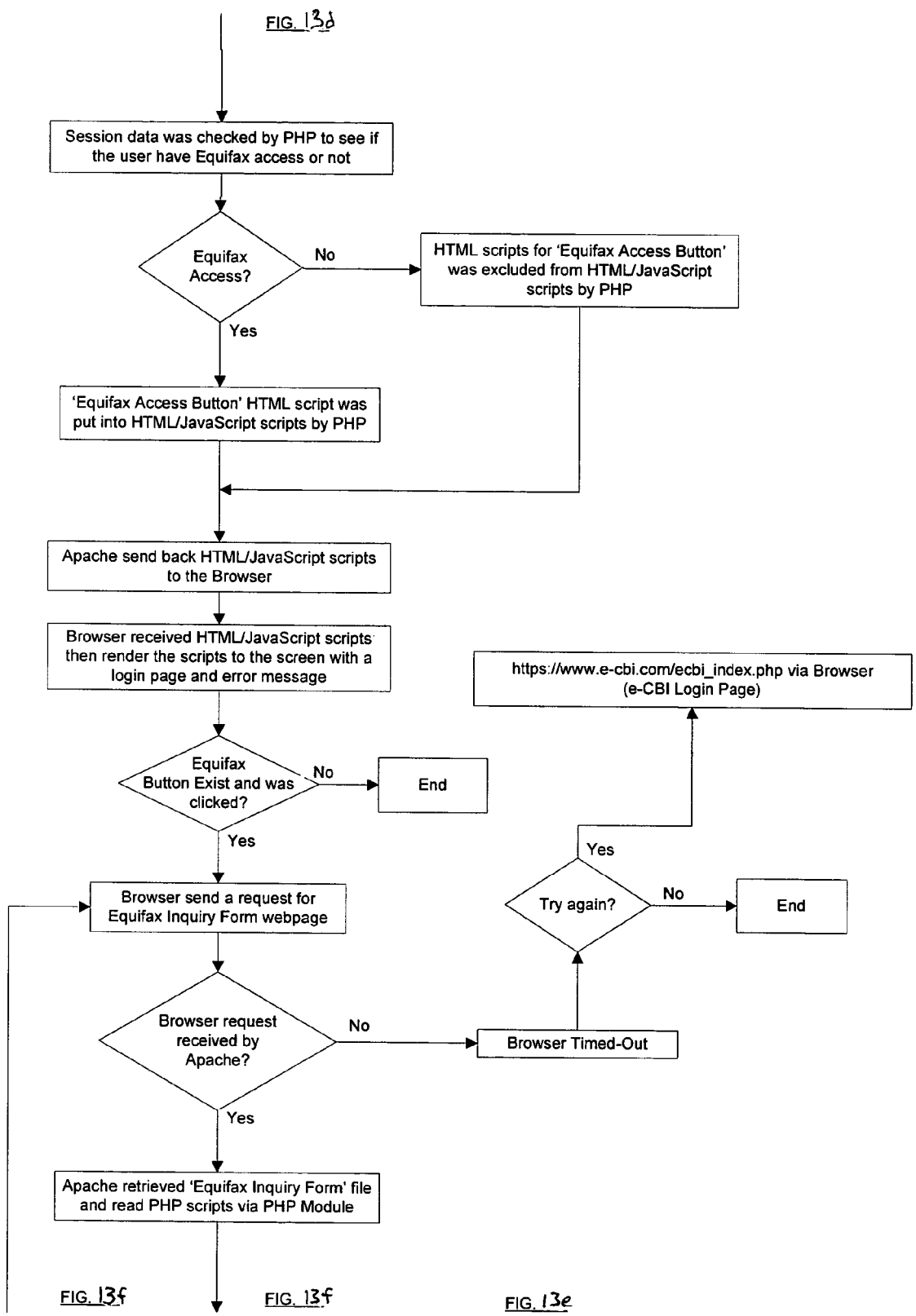

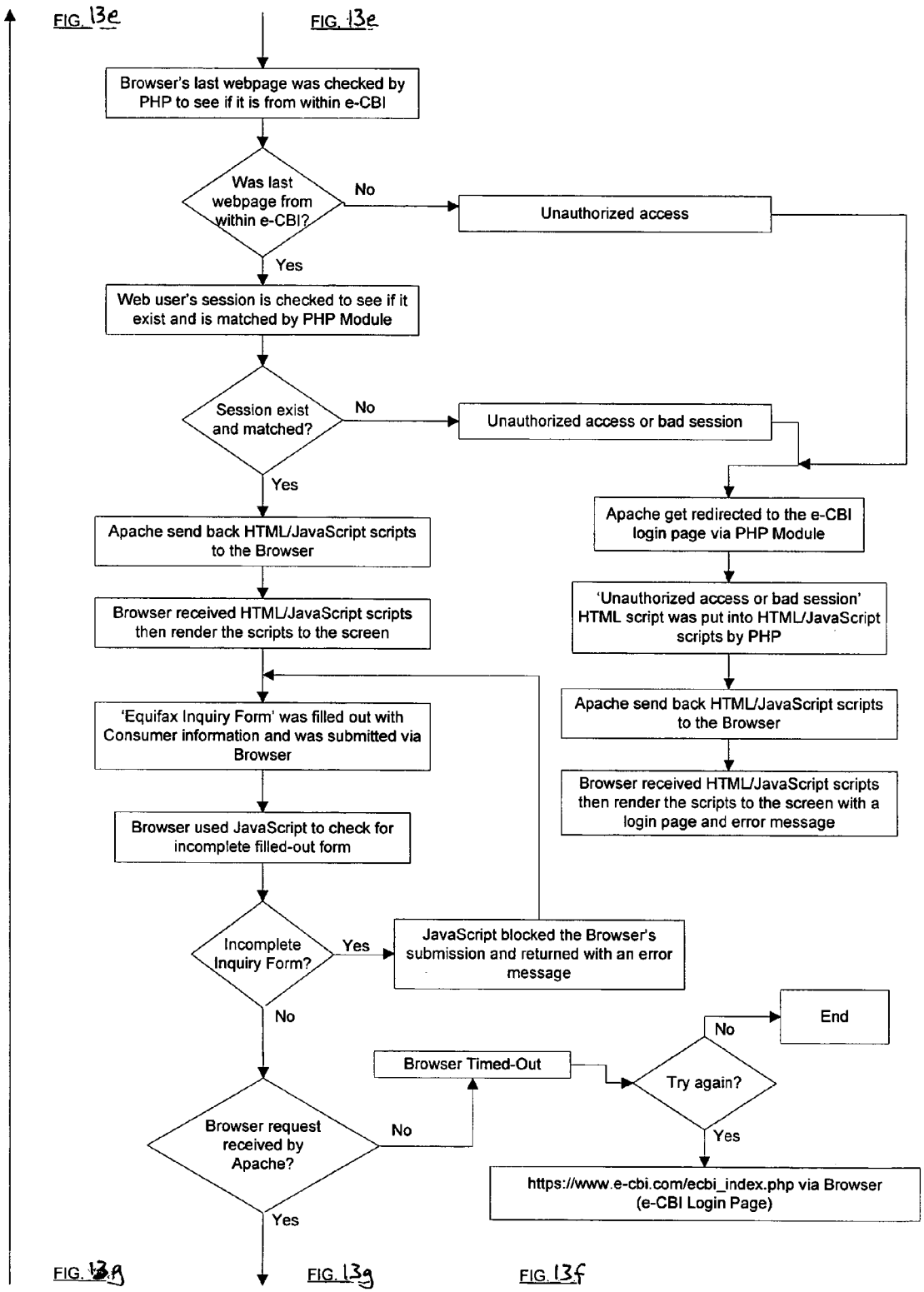

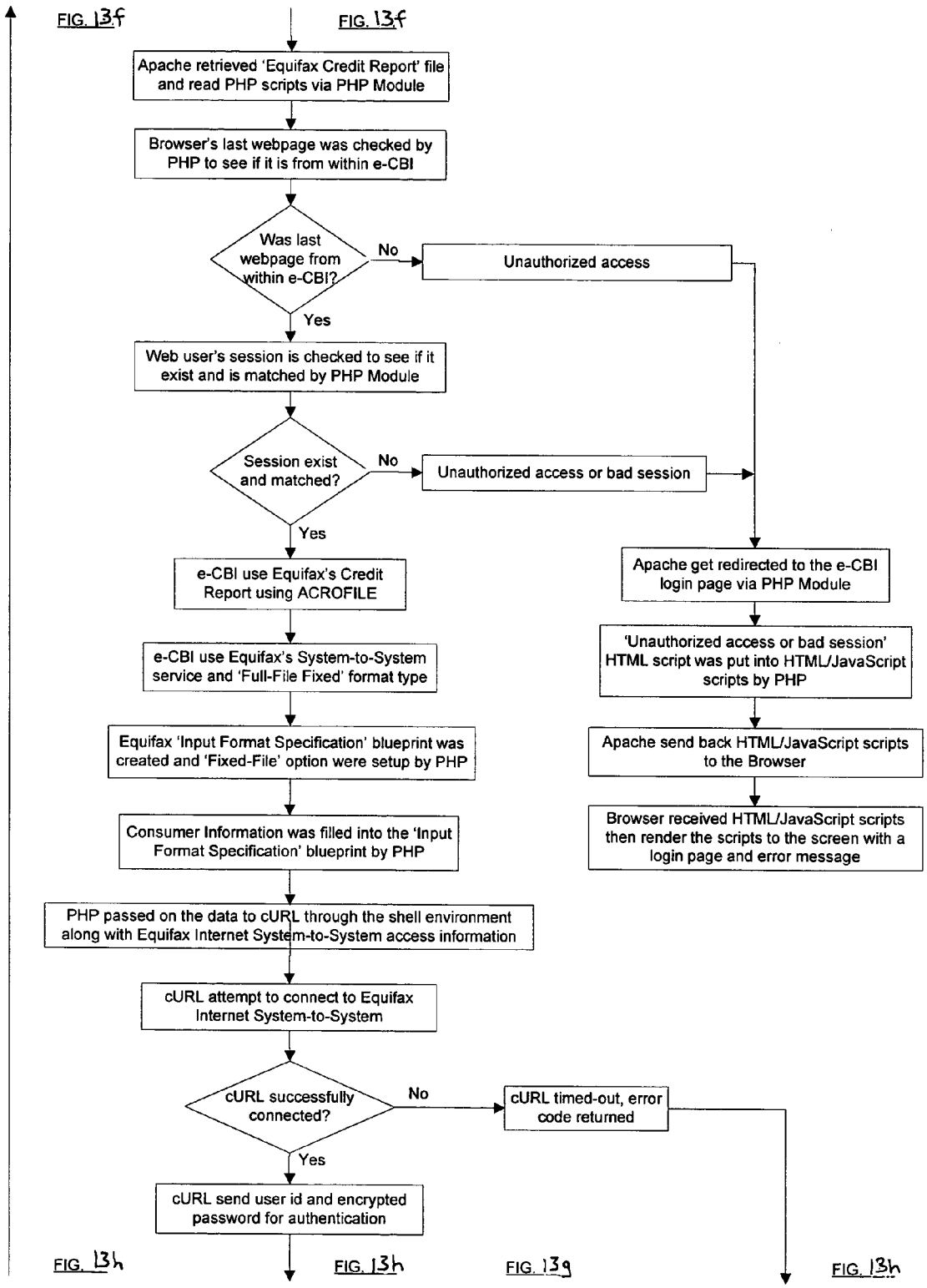

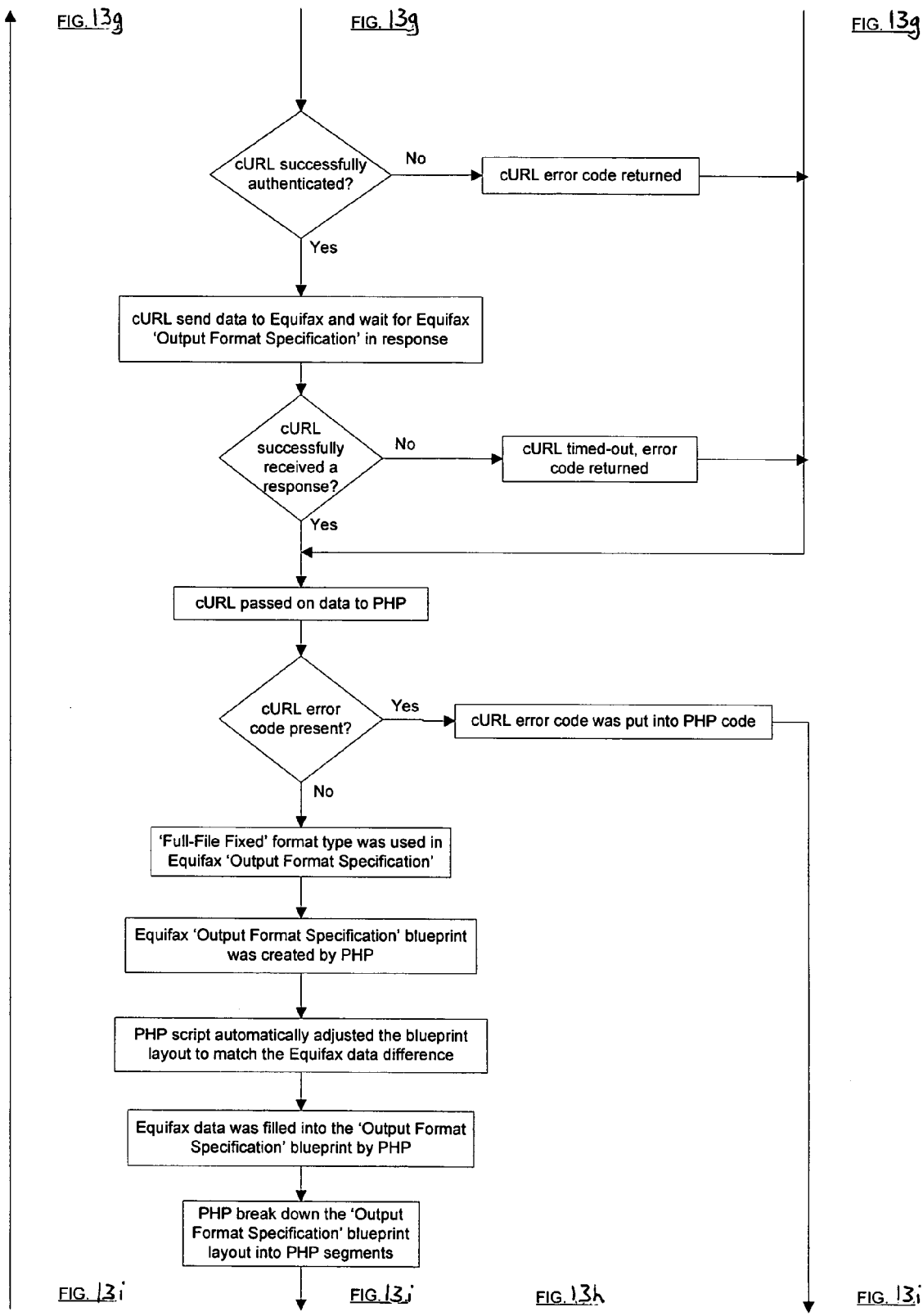

SYSTEM AND METHOD FOR REAL-TIME ELECTRONIC INQUIRY, DELIVERY, AND REPORTING OF CREDIT INFORMATION

CROSS REFERENCE TO RELATED APPLICATIONS

The present patent application is a continuation-in-part patent application of U.S. patent application Ser. No. 09/420,885 filed on Oct. 19, 1999 now U.S. Pat. No. 6,988,085.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

This invention relates to computerized information management and processing systems generally, and more particularly to a computer-implemented system and method for automatically sending, retrieving, and delivering credit information via the Internet. In one aspect, the present invention pertains to a system for providing real-time electronic inquiry and delivery of personal credit information to any remote user (i.e., client) having appropriate computer and Internet access software. In a second aspect, the present invention pertains to a method of using the Internet and web sites for accepting client requests for credit information in a web browser-supported format, acquiring the information from credit information repositories or bureaus by converting the web browser-supported requests to a format the credit bureau will accept, reformatting the response from the credit bureau back into web browser-supported format, and transmitting the web browser-supported response to the client's computer.

When a potential borrower wishes to obtain a loan to finance a major consumer purchase such as a house or automobile, the vendor or lending institution usually requires the potential borrower to fill out a loan application. Typically, the applicant completes the application by hand, providing information such as name, address, social security number, employer, and previous addresses. The information contained in the application can be confidential in nature and should be protected from inadvertent disclosure to those not having a need-to-know.

Using information from the loan application, a sales representative or loan officer may request an inquiry copy of the applicant's credit report from a credit bureau. Currently, the United States has three major credit bureaus—Equifax, Trans Union, and Experian (formerly TRW). Hundreds of smaller credit bureaus exist; but virtually all are affiliated with one or more of the three major credit-bureaus. The sales representative or loan officer may request the inquiry copy, for example, by using a personal computer having appropriate software, by calling the credit bureau to obtain a teletype (TTY) credit report, or by on-line request using a teleprompter, which is a small terminal provided by the credit bureau. Access is typically by conventional dial-up methods. Information returned in the response from the credit bureau is also confidential and should be protected.

Credit bureaus receive income from subscribers for the credit bureau's services. Credit bureaus charge the subscribers a fee whenever the subscribers "pull" a credit report. In return, the credit bureaus maintain the files of credit information and provide the information to their subscribers. Credit bureaus update their files by using, for example, the inquiries or requests made by subscribers and accounts receivable tapes provided by subscribers. In addition, each credit bureau has its own format for receiving requests from, and sending responses to, its subscribers. Certain items in credit bureau inquiry responses are encoded or abbreviated such that the information in the response may be very difficult to read and understand, which can adversely impact loan application decisions.

The current approaches for request and delivery of credit inquiries have, but are not necessarily limited to, the following problems and drawbacks. First, requests and responses transmitted using modems and conventional dial-up lines may not be encrypted or provide adequate security for the confidential information. Second, current credit inquiry systems may require users to maintain proprietary software on their computers, which could be costly. In addition, responses delivered to subscribers using the credit bureau's format may be difficult to read and understand. Finally, current systems often do not enable businesses to provide to credit bureaus on-line credit reports concerning borrowers.

Certain aspects of the credit inquiry and reporting process have been automated to various extents. However, a need exists for a comprehensive system for requesting inquiries from and providing reports to credit bureaus that solves the problems outlined above.

SUMMARY OF THE INVENTION

The present invention provides such a system and method for requesting credit inquiries by clients, delivering responses to credit inquiries from credit bureaus to clients, and reporting credit information by clients to credit bureaus, which eliminate the drawbacks of the currently employed methods of credit inquiry and reporting.

The present invention provides a client-server solution for electronic inquiry, delivery, and reporting of personal credit information to and from credit bureaus using either serial communications and dial-up access, or the Internet and Transmission Control Protocol/Internet Protocol (TCP/IP). In the preferred embodiment, the present invention uses the Internet as a communications link between the client (also referred to as the user) and a service provider's computer hardware, such as a web server software that functions as an intermediary between the client and the credit bureaus.

To access the system of the present invention, the client has the following: (1) access to the Internet, such as a personal computer with Internet connection; (2) means for secure transmission over the Internet, such as a web browser with at least 128-bit secure sockets layer ("SSL") encryption capability (SSL is standard, for example, in the Netscape Navigator and Microsoft Internet Explorer web browsers); and (3) an account set up on the web server software. In addition, a security certificate issued by a trusted certifying authority, such as Verisoft, is installed on the client's computer and on the central processor. A security certificate is a password-protected, encrypted file of data identifying the transmitting entity. The certificate also includes encryption keys or algorithms, allowing the entities exchanging data to authenticate each other.

The client uses a web browser on the client's computer or terminal to access the web site that is hosted on the service provider's web server software of the present invention. First, the client logs on to the system using a user name and password. Then the client enters data (e.g., customer name, address, and social security number) on an Inquiry Form generated by the web server software. When the client clicks a "SUBMIT" button on the form, the client's web browser encrypts the data using standard 128-bit SSL technology, which is provided by SSL browsers and web servers. If the client's web browser is not at least a 128-bit SSL version, then the web server software informs the client that such a version must be downloaded before proceeding. The encrypted data, which is in the web browser-supported format, is passed to at least one web application executing by the web server software. The at least one web application is a specification that defines communications between information servers and resources on the server's host computer.

Next, the at least one web application decrypts the data, parses the information from the form, and converts the information to a standard format required by the particular credit bureau to receive the request. The credit bureau contacted may be one of the three major credit institutions (i.e., Equifax, Experian, or Trans Union), or any other credit bureau to which access has been previously authorized. The at least one web application then places the reformatted data into an input file and initiates a query to the credit bureau's computer. Using a dedicated connection circuit, the at least one web application transmits the query to the credit bureau. The credit bureau sends a response to the query to the web server software in a non-web-browser-supported format.

After the web server software receives the response from the credit bureau, the at least one web application creates an output file containing the response from the credit bureau. The at least one web application parses and converts the data in the output file to web browser-supported format and encrypts the data, preferably using at least 128-bit SSL technology. The present invention does not analyze or permanently save the results it receives from the credit bureau. The at least one web application then sends the web browser-supported formatted data back to the client's web browser using the Internet, where the inquiry response is displayed in the client's web browser.

The primary objective of the present invention relates to receiving requests for credit information from clients in web browser-supported format and sending responses back to clients in web browser-supported format. The present invention provides a standard interface that is transparent to clients—clients do not have to interpret inquiry responses in various formats from different credit bureaus or enter data in various formats on different computer screens. Thus, a more specific object of the invention is to provide a fully automated, computer-based system for electronically inquiring, delivering, and reporting credit information using a standard web browser and the Internet.

From the foregoing, it will be apparent to the reader that another object of the present invention is to provide a novel, improved system and method for requesting credit information from credit bureaus and delivering responses to credit inquiries to users in an easily understood format in shorter periods of time than is possible using current credit inquiry techniques. Thus, the present invention becomes a more valuable tool in providing the credit information necessary for making credit-related decisions.

Another primary object of the present invention is to provide a system and method for businesses to provide credit information or credit reports on-line to credit bureaus.

BRIEF DESCRIPTION OF THE DRAWINGS

These and other objects, features, and advantages of the present invention will become better understood upon review of the following description and accompanying drawings, in which:

FIG. 3 is an example of a screen seen by a client at the client's computer or computer terminal when the client establishes an HTTP connection to the service provider's central processing unit, according to the present invention;

FIG. 4 is an example of a screen seen by a client at the client's computer or computer terminal requesting the client to enter a user name and password, according to the present invention;

FIG. 5 is an example of a screen seen by a client at the client's computer or computer terminal when the client initiates a request for credit information, in accordance with the present invention;

FIG. 7 is an example of a screen seen by a client at the client's computer or computer terminal when the client initiates the reporting of credit information to a credit bureau, in accordance with the present invention;

FIGS. 11a–11c show an example of a credit bureau response resulting from a client request for credit information, according to the present invention;

FIGS. 13a–13i are detailed operational flow diagrams of the at least one web application executed by the web server software described in FIG. 12.

DETAILED DESCRIPTION OF THE INVENTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of the present invention. Those skilled in the art should appreciate that they may readily use the concepts and specific embodiment disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
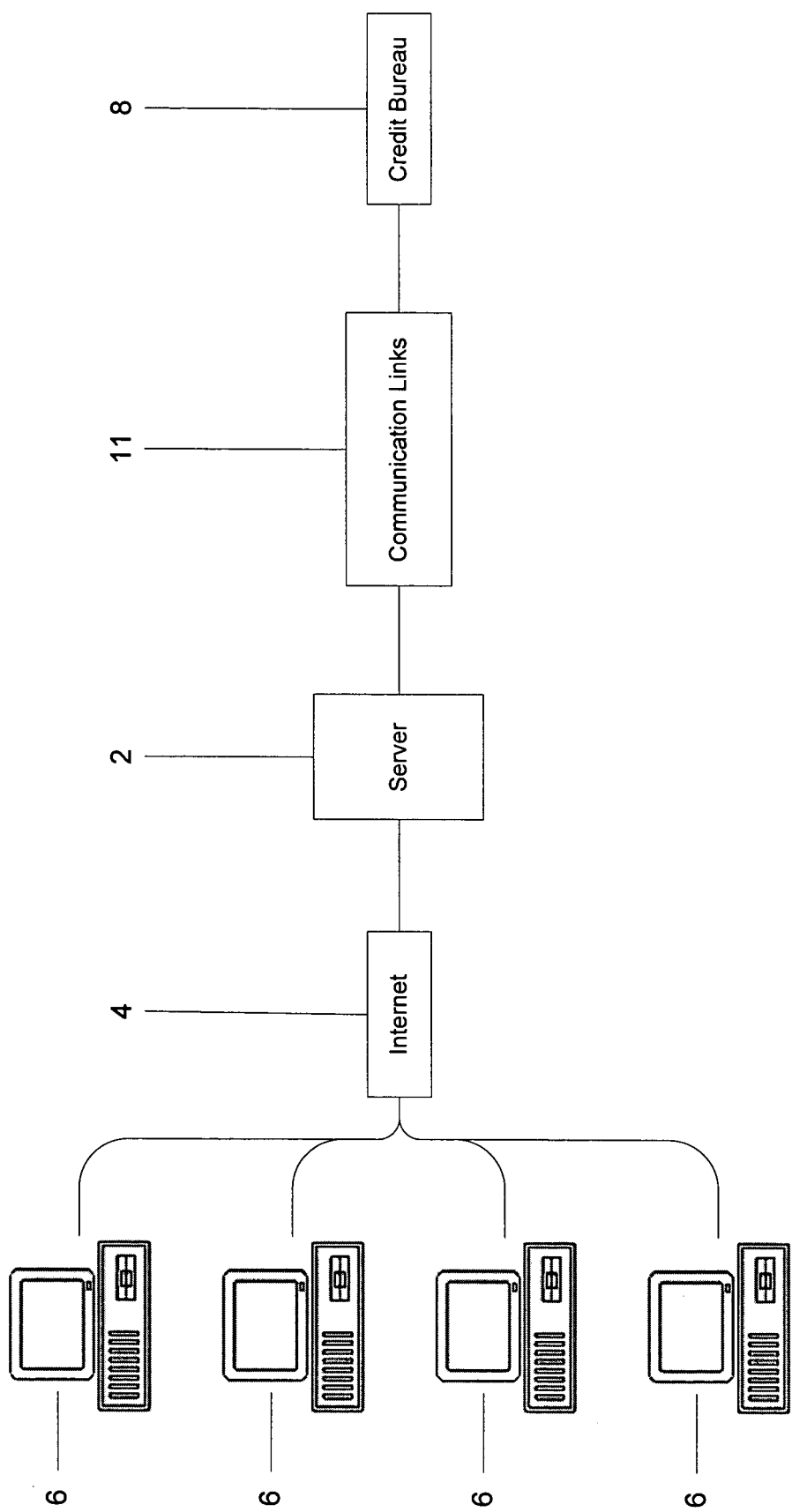
FIG. 1 is a block diagram of a system for clients to make credit inquiries and credit bureaus to deliver credit inquiry responses to clients, all in accord with the principles of the present invention.

FIG. 1 depicts a system that embodies the principles of the present invention (also referred to as "e-CBI"). The invention generally comprises an automated credit information inquiry, delivery, and reporting system as shown. The major components of the system include a service provider's computer hardware running a web server software (also referred to as the "e-CBI server") 2 and a communication network 4 for connecting the web server software 2 to clients' personal or other computers or terminals 6.

The web server software 2 functions as a centralized conduit for the collection and transmission of data between the clients 6 and the credit bureaus 8. The web server software 2 does not analyze or permanently save the results from the credit bureaus 8; rather, the web server software 2 passes the results directly to the client 6. Any number of clients 6 can access the web server software 2 to make inquiries for credit information or provide reports to the credit bureaus 8. The web server software 2 can be any mainframe, super-mini, or minicomputer system having the capability of handling a real-time, multi-tasking, remote-access database application. In the preferred embodiment, the web server software 2 is an Intel 486 or higher processor-based computer running a Unix operating system; however, any operating system with multiple-tasking capabilities is appropriate.

The web server software 2 executes at least one web application. Server side scripting process(es) are employed by the present invention to communicate between the web browser and the web server software 2, as best shown in FIGS. 12a–12c and FIGS. 13a–13i. The responses may be generated dynamically and may utilize server side scripting such as (ASP, PHP, JSP, etc.), as well known to a person of ordinary skill in the art. Advantageously, the present invention allows a client to view a credit report in any web browser-supported format, including HTML, JAVA, Word and PDF, for example.

The at least one web application consists of two program modules or processes—a main process and a child process. The main process communicates with the client 6 and performs functions such as preparing queries, decoding results received from the credit bureaus 8, and formatting responses. The child process communicates with the credit bureau's computer 8. The at least one web application is written in the "C" programming language. However, many other programming languages may be used to achieve the same functionality. The at least one web application implements and controls the processing of requests (inquiries) from clients 6 for credit information from credit bureaus 8 and delivery of the responses from the credit bureaus 8 to the clients 6, and the reporting of credit information from clients 6 to the credit bureaus 8.

The at least one web application's processes embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such computer programs to implement the disclosed invention without difficulty based on the flow charts and associated description. Therefore, disclosure of a particular set of program code is not considered necessary for an adequate understanding of how to make and use the invention.

Several configuration files govern the programs of the present invention. The configuration files can be used to adapt the present invention for retrieval of different inquiry responses from different credit bureaus. This allows customization without changing any of the "C" source code. The configuration files are categorized according to the inquiry and response features of the present invention.

The inquiry feature of the present invention (i.e., formulation and transmittal of the client's request for credit information) uses three types of configuration files. Session definition files determine which communication program should be used (i.e., serial or socket-based), names of various temporary files, which credit bureau 8 to contact, and other configuration files to use. Inquiry definition files describe the format of an inquiry segment (i.e., the data associated with a request that is sent to a credit bureau 8) required by a particular credit bureau 8. Finally, a session script file describes the negotiation process required to log on to a credit bureau's computer, send the inquiry segment, and receive from the credit bureau 8 either a report segment (i.e., the data containing the credit inquiry response from the credit bureau 8) or an error segment (i.e., data related to errors in retrieving or transmitting credit bureau responses).

The response feature of the present invention (i.e., the return of a response from the credit bureau 8) uses two types of configuration files. The first type, a report description file, describes the format used by the credit bureau 8 when returning the response to the client inquiry to the web server software 2 in the form of a binary data segment. This file allows the programs to decipher or parse the incoming data. Output description files, the second type of configuration file associated with the response feature, describe how the data segment returned by the credit bureau 8 and parsed by the programs should be displayed on the client's computer screen, printed on the client's printer, and saved in the client's internal archive files.

A communications network 4, preferably the Internet, connects the web server software 2 to the clients' computers. Alternatively, the communications network 4 may take a variety of other forms, such as a local area network, a wide area network, a satellite communications network, a cellular communications network, ordinary, telephone lines, or private leased lines. The web server software 2 is also linked to one or more credit bureaus 8 by dedicated lines 10.

In the preferred embodiment, the present invention uses the internet 4 for communications between the clients' computers and the web server software 2 (which functions as a web server), and the clients' computers have web browsers to access a web site hosted on the web server software 2. To access the system of the present invention, the client 6, preferably, has the following: (1) a computer with access to the internet 4, such as a personal computer with an internet connection, although a mini-computer or mainframe computer may also be used; (2) means for secure transmission over the internet, such as a web browser with 128-bit secure sockets layer (SSL) encryption capability; and (3) an account set up on the central processor 2. In addition, a security certificate issued by a trusted certifying authority, such as Verisoft, is installed on the client's computer and on the web server software 2.

Communications between a web browser and a web server are typically made according to the hypertext transfer protocol (HTTP). However, http is generally not secure. To provide additional security, public-key authentication and encryption can be added to http. In the preferred embodiment, the web server software 2 of the present invention uses hypertext transfer protocol secure (HTTPS), which is a type of server software providing digital certificate encryption of data using SSL technology. SSL technology is the standard industry method for protecting web communications.

Figure 2:
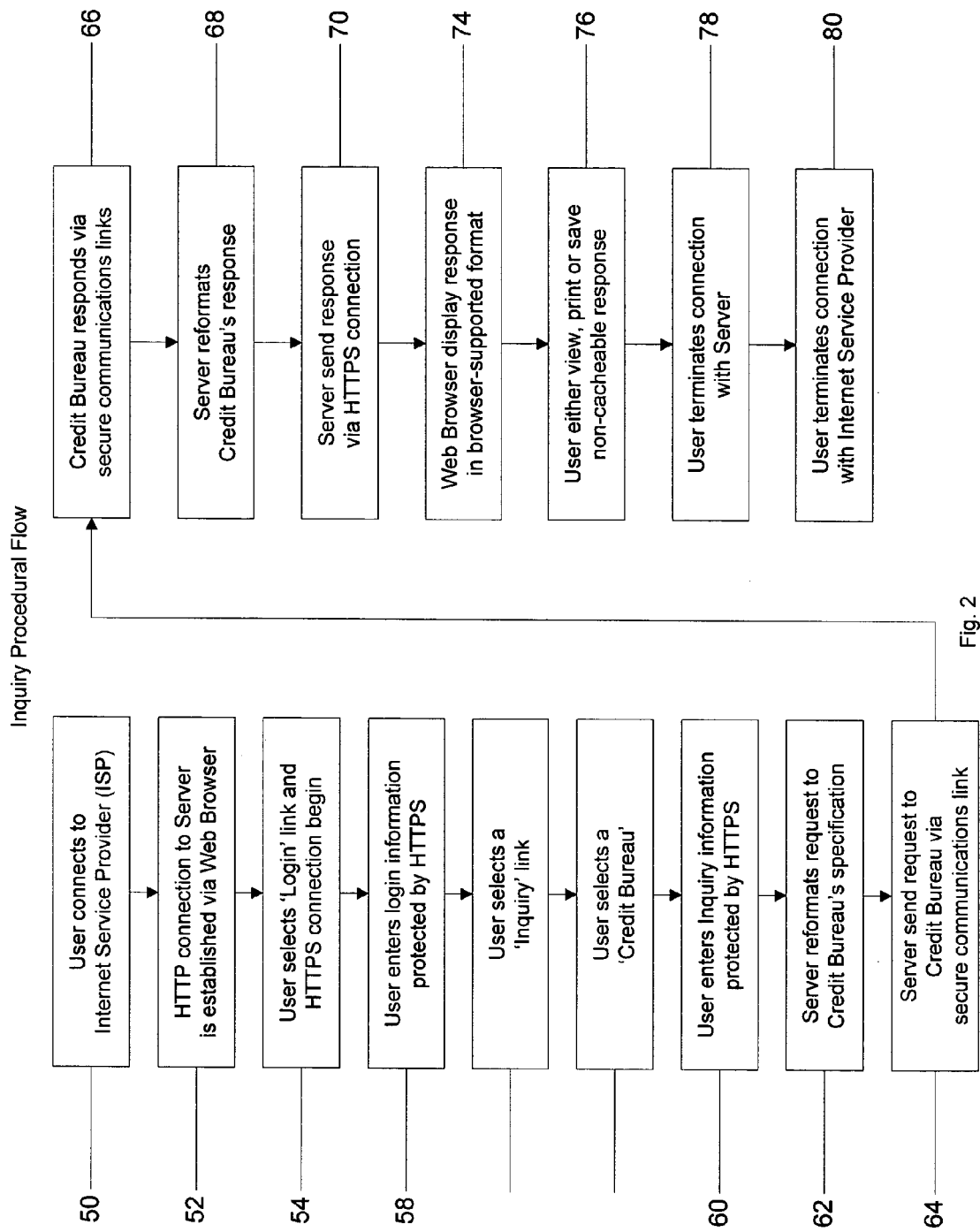
FIG. 2 is a flow diagram of a process for requesting credit information from credit bureaus and delivering responses to clients, in accord with the principles of the present invention.

The present invention provides isolation of the client 6 or third parties from the credit bureau 8, which is achieved by the web server software 2 having two separate physical Ethernet interface cards. One card connects to the internet-visible LAN and responds only to HTTP data packet traffic, providing basic HTTP web server functionality. The at least one web program, initiated by clients 6 through the HTTP/web browser-supported interface, formats client 6 requests and initiates communications with a credit bureau 8 through the second Ethernet card. At no time is there any possibility of a direct feed-through of TCP/IP data packets between the two Ethernet cards—only the at least one web program has access to a credit bureau's router. Clients 6 cannot directly connect to the credit bureau 8 because all communications must pass through the web server software 2. The web server software 2 thus performs a proxy function. Outside parties cannot physically gain access to and retrieve information from a credit bureau 8 without first being properly authorized, resulting in a secure interface to the credit bureau FIG. 2 depicts the high-level procedures involved in making credit inquiries and receiving credit bureau responses to inquiries. When a client 6 wants to request credit information from a credit bureau 8, the client 6 first logs on to the web server software 2 by connecting to an Internet service provider (ISP) 50 and establishing an http connection 52 to the web server software 2. FIG. 3 illustrates the first screen displayed to the client 6. The client 6 selects the link for "members only," initiating an https session 54. On the next screen displayed to the client 6, the client 6 selects the link for "credit bureau inquiry" 56, shown. The client 6 provides a user name and password, as shown in FIG. 4, which is protected by https 58. The at least one web application on the web server software 2 performs user authentication, preventing unauthorized users from accessing the services of the present invention.

Next, the client 6 enters credit inquiry data (e.g., customer name, address, and social security number), protected by HTTPS, within text boxes on an inquiry form provided by the web site of the present invention 60. FIG. 5 illustrates an example of the inquiry form. The data entered by the client 6 are in the web browser-supported format. When the client 6 clicks a "submit" button on the inquiry form, as shown in FIG. 5, the web server software 2 verifies that the client's web browser supports standard 128-bit SSL technology. If this technology is supported, then the client's web browser encrypts the data using the standard 128-bit SSL technology, and the encrypted data is passed to the at least one web application residing on the web server software 2. If the client's web browser does not support 128-bit SSL technology, then the web server software 2 sends the client 6 a message stating that a 128-bit version of, for example, the Netscape navigator or Microsoft internet explorer web browser must be downloaded before proceeding.

Figure 6:
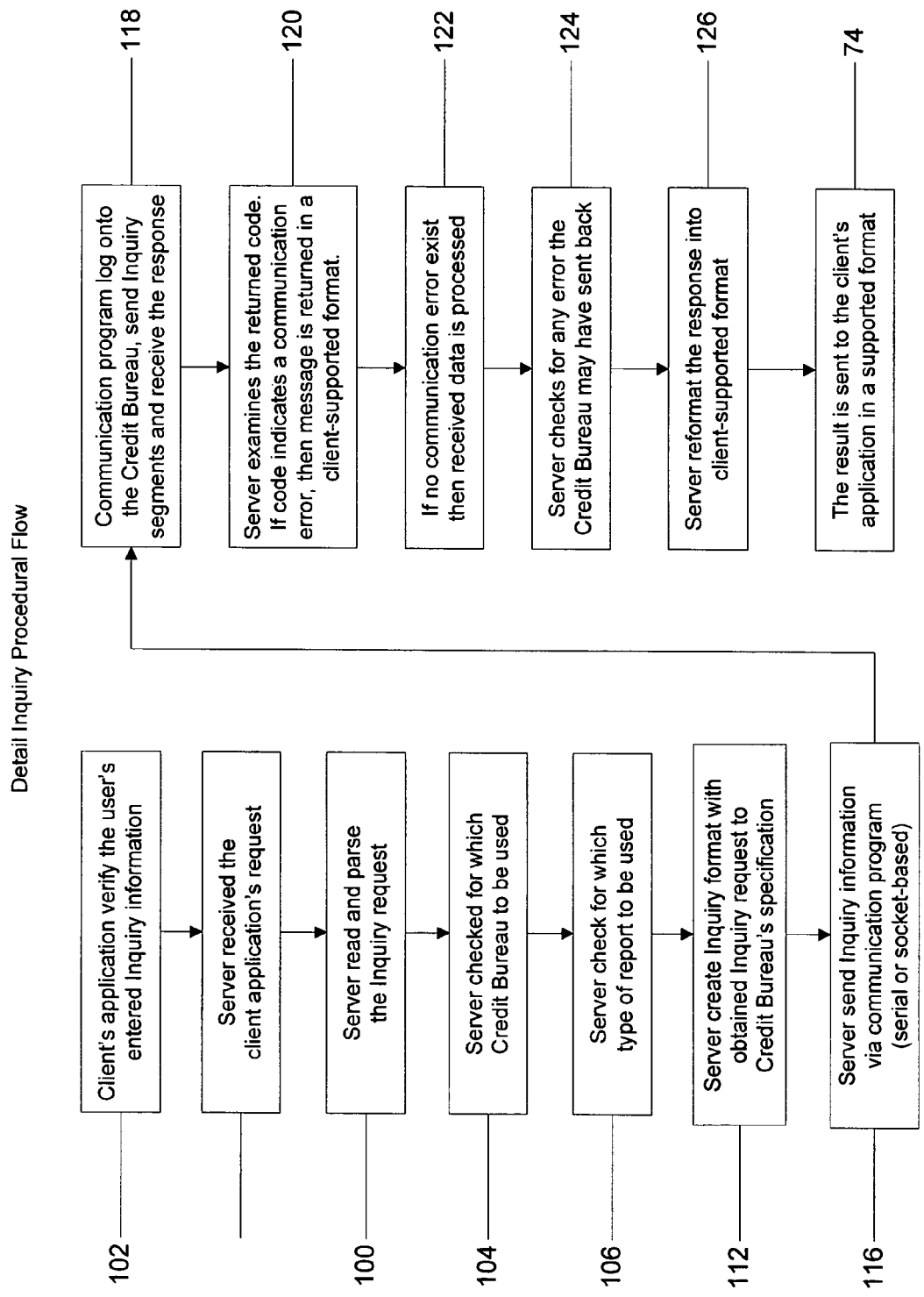
FIG. 6 is a functional flow diagram of the central processing unit's software according to the present invention.

Whenever, a client 6 either requests credit information from, or reports credit information to, a credit bureau 8, the web server software 2 executes the at least one web program. The at least one web application's main process first decrypts the data 62. Referring to the web server software 2 program flow illustrated in FIG. 6 and to the inquiry procedural flow of FIG. 2, the main process then reads and parses the parameters passed from the web browser-supported inquiry form 100, verifying the validity and consistency of the inquiry form data 102.

After determining which credit bureau 8 to access 104, the main process determines which type of credit bureau response the client 6 is requesting 106. For example, referring to the embodiment of the present invention depicted in FIG. 5, clients 6 may request the following types of responses: "STD" (standard), "beacon," "O/L dir" (online directory), and "all." These choices reflect the types of products that are available from Equifax. If a client 6 wants to make a standard inquiry and receive no additional information from Equifax, then the client 6 selects "STD." If the client 6 selects "beacon," Equifax will send the client 6 an additional product called a beacon® score, which is a scoring system developed by Equifax to help creditors make credit decisions. If the client 6 selects "O/L dir," Equifax will send the client 6 an additional product called online directory, which provides the client 6 with telephone numbers for companies provided in the response to the inquiry. Finally, if the client 6 selects "all," then Equifax will send both beacons and online directory as additional products.

After determining the type of credit bureau response, the main process opens the corresponding session definition file (SDF) 108. The main process then reads and parses the SDF 110 and the inquiry definition file (IDF), and combines the inquiry segment pattern (i.e., the data pattern required by the credit bureau 8) in the IDF with the IDF data and the inquiry data obtained from the web browser-supported inquiry form 112. The main process places the reformatted data into an input file. The result is a temporary file containing the inquiry segment in the standard format required by the particular credit bureau 8 to receive the request 114.

The standard format, for example, for Equifax, is called "system-to-system." All major credit institutions have a similar standard for providing an on-line credit inquiry and reporting interface with their central computers. With proper credit institution approval, the present invention can be configured to interface with any of these credit institutions by programming a separate at least one web application for each credit institution. Generally, a credit bureau's interface standard contains the following: (1) a list of supported communication protocols/methods; (2) a list of available sign-on procedures; and (3) a list of settings the credit bureau's computer expects to be answered before data transmission can proceed.

After reformatting the data, the at least one web application "forks" the program (i.e., initiates the child process) 116. The child process, in the form of the proxy application, initiates a query to the credit bureau's computer 8 by executing a communications program 116. The communications program accesses the session script file and uses instructions found in the file to log on to the credit bureau's computer 118 over a dedicated connection circuit or line 10. The dedicated line 10 is a high-speed, unshared communications link between the web server software 2 and the credit bureau 8. The communications program transmits the inquiry segment 64 to the credit bureau 8 and receives the non-web browser-supported response 66 in the form of a report segment or an error segment.

Upon receiving the credit bureau's response, the child process creates an output file containing the response. The parent process (i.e., the main process of the at least one web application) waits for the child process to terminate, and then examines the returned data 120. If the data indicates a communications error, the parent process sends an appropriate message in web browser-supported format to the client 120. If no communications error occurred, the parent process accesses the report description file and uses the file to parse the received data in the output file 122. The parent process then determines whether the returned segment was an error segment 124. Error segments are generated by a credit bureau 8 if the credit bureau 8 experiences an internal error or if the inquiry segment contained invalid data, such as a name and social security number that are not found in the credit bureau's files.

The parent process accesses the output description file (ODF), parses the ODF, and uses the information found in the ODF to convert the report segment received from the credit bureau 8 into the format defined in the ODF (preferably web browser-supported) 126. The parent process then encrypts the web browser-supported data using 128-bit SSL technology 68 and sends the result over the Internet 4 to the client's computer 70. The response is displayed in its native format, which could be either a text-oriented terminal or, preferably, a web browser-supported-based browser 74. In the preferred embodiment, the data is displayed in a web browser after verification of the authenticity of the response 72 in a more readable format. The response is not cacheable 76. To preserve the response, the client 6 must print or save the response 76.

When the client 6 is finished, the client terminates the session with the central processor 2 of the present invention 78, and finally terminates the connection with the ISP 80. Normally, in about 5 seconds to about 10 seconds, the credit bureau 8 will have processed the request and returned the report to the web server software 2. Likewise, the transaction may be completed and the report made available to the client 6 in about 5 seconds to about 10 seconds, depending on factors such as bandwidth, types of computers used, and number of users.

Figure 7:
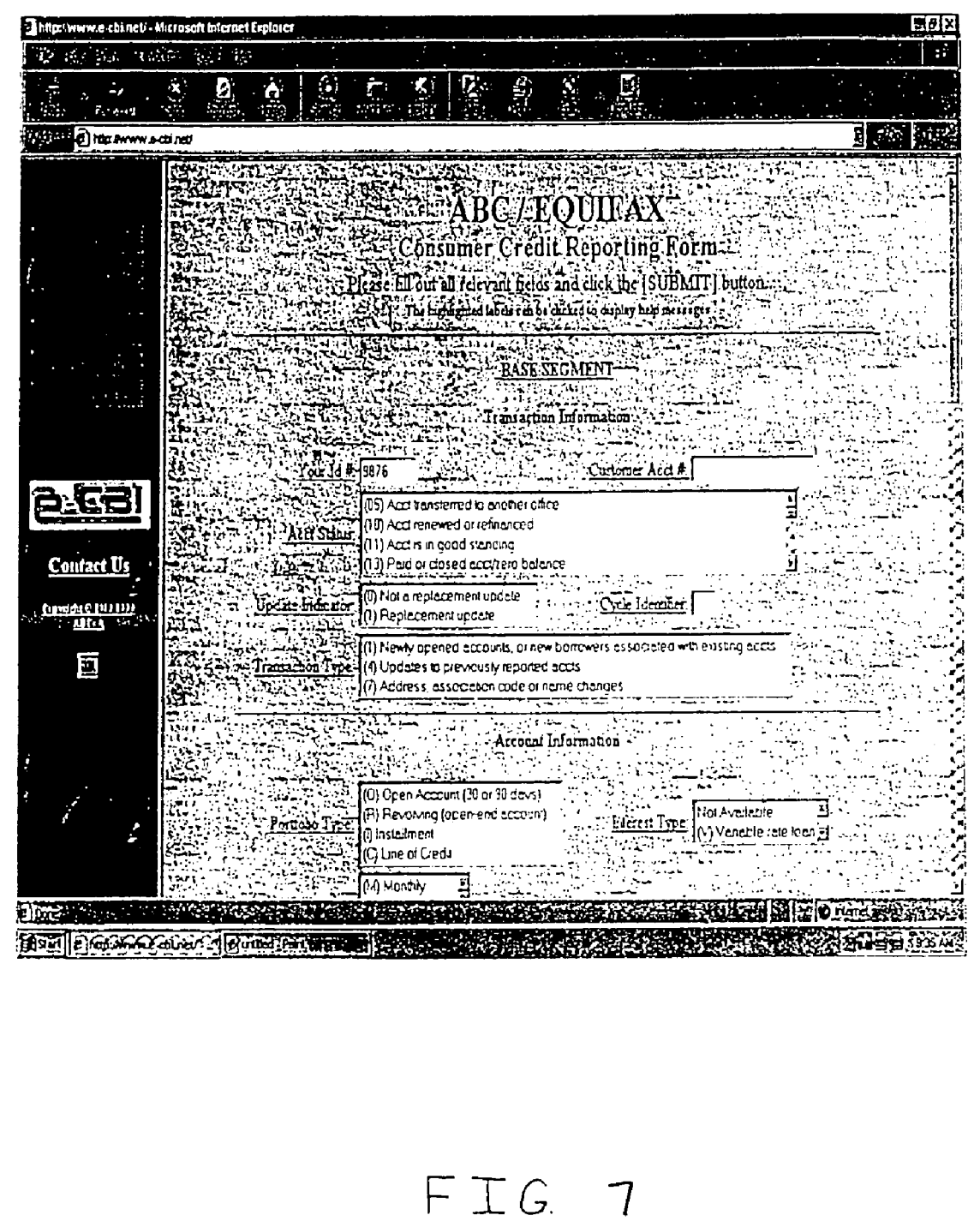
Figure 8:
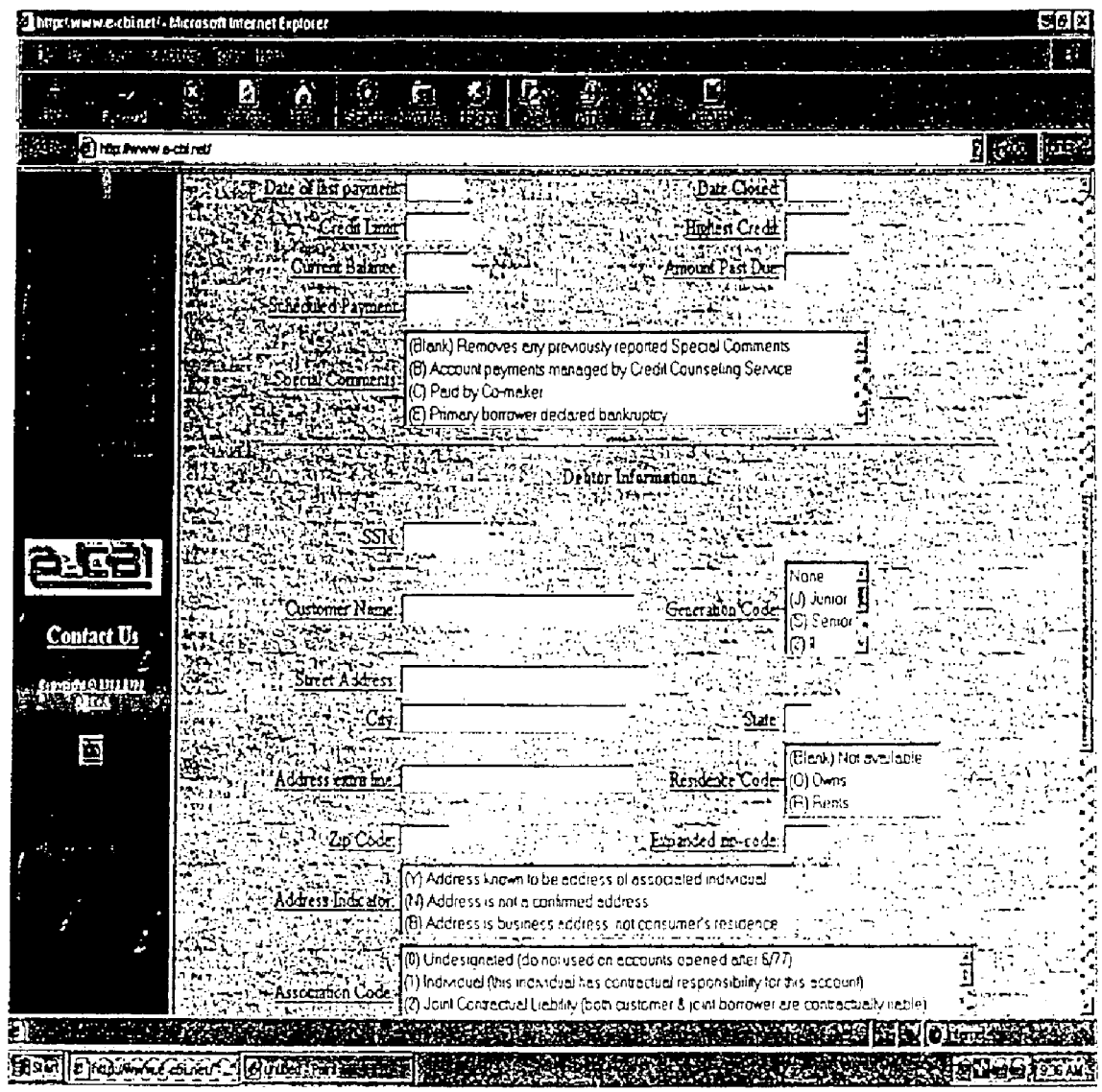
FIG. 8 another example of a screen seen by a client at the client's computer or computer terminal when the client initiates the reporting of credit information to a credit bureau, in accordance with the present invention.
Figure 9:
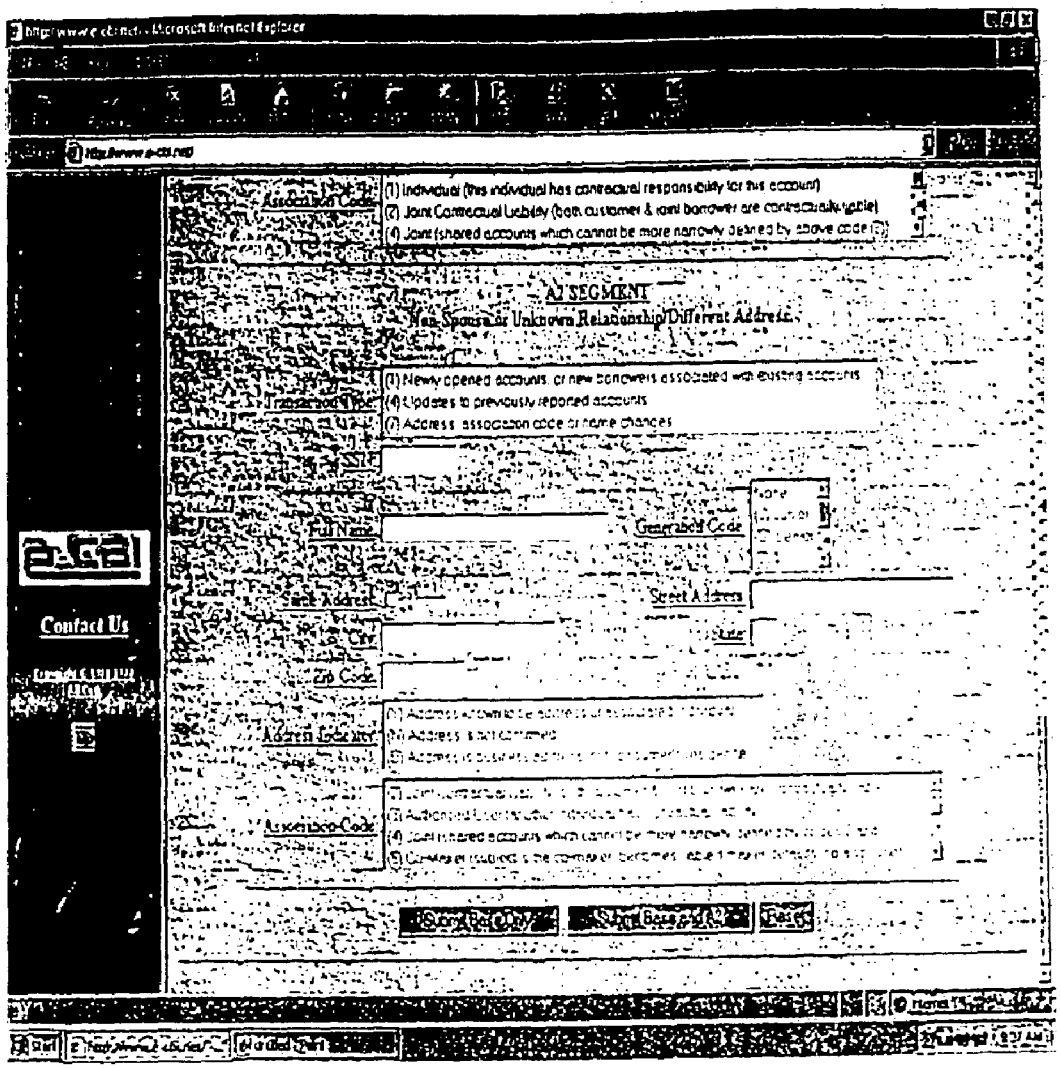
FIG. 9 is a third example of a screen seen by a client at the client's computer or computer terminal when the client initiates the reporting of credit information to a credit bureau, in accordance with the present invention.

The present invention also allows clients 6 to report credit information to the credit bureaus 8. Examples of forms the client 6 completes for credit reporting are shown in FIGS. 7–9. The preferred embodiment for the credit reporting aspect of the present invention uses the "metro" format standard. The metro format is a universal standard that all major credit institutions adhere to. The format defines codes to report for credit criteria such as past due status, repossession, and bankruptcy. The present invention warehouses these reports for approximately a 30-day period. Then, the reports are downloaded to tape media, and the tapes are forwarded to the appropriate credit bureau 8.

Figure 10:
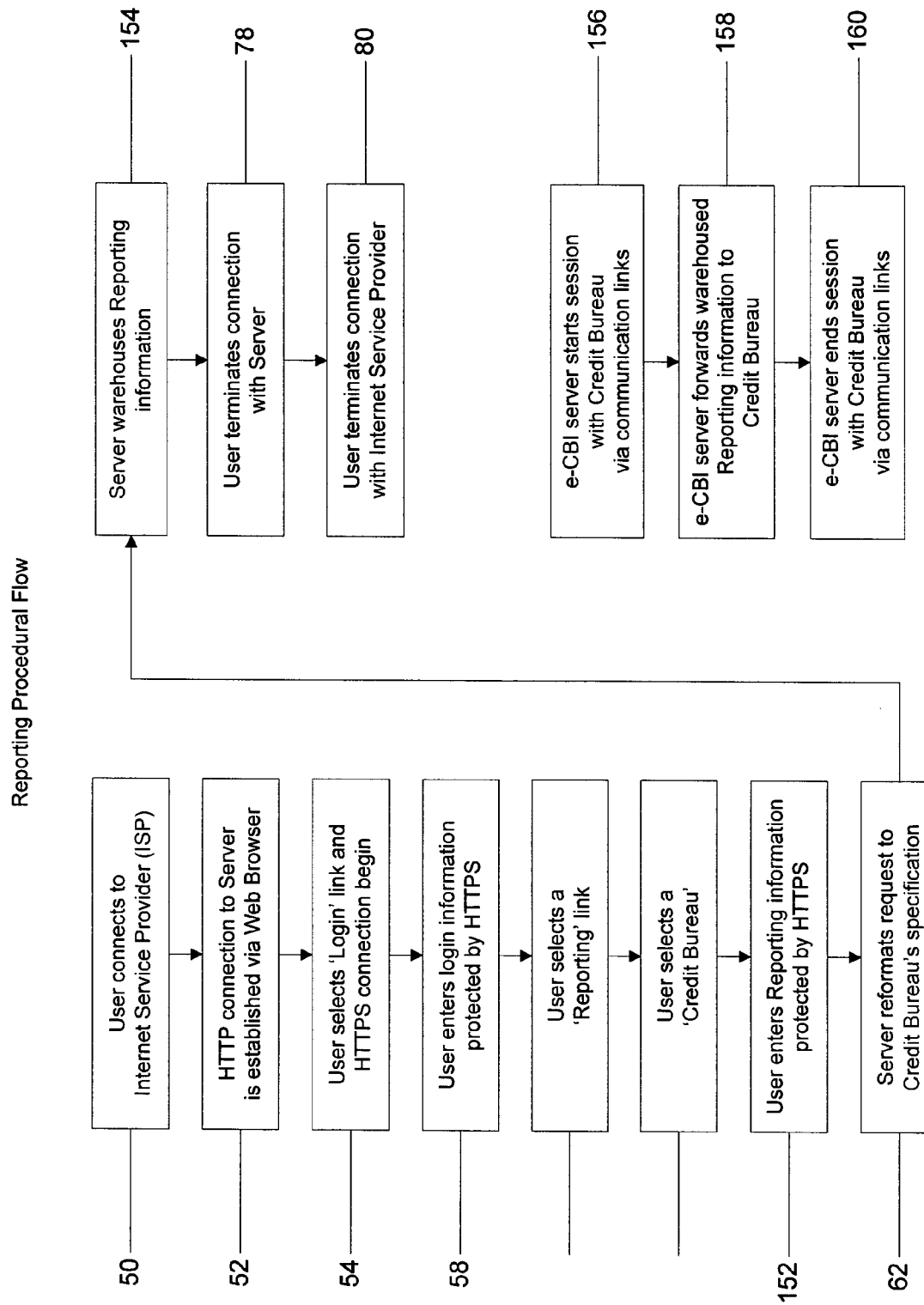
FIG. 10 is a flow diagram of a process for reporting credit information to a credit bureau according to, the principles of the present invention.
Figures 12A, 12B:
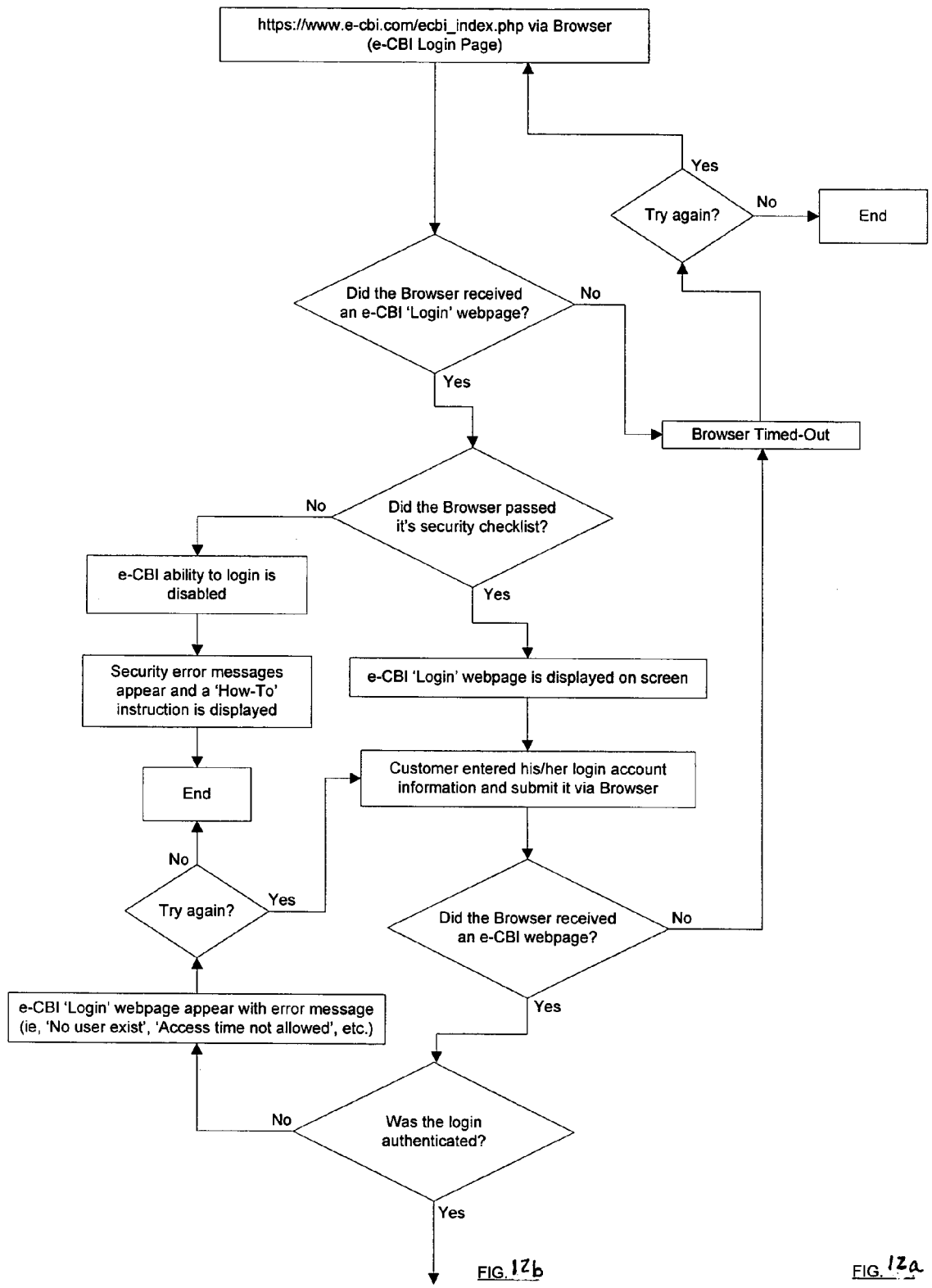
FIGS. 12a–12c are operational flow diagrams of the web server software from an end-user perspective, according to an alternate embodiment of the present invention.
Figure 12C:
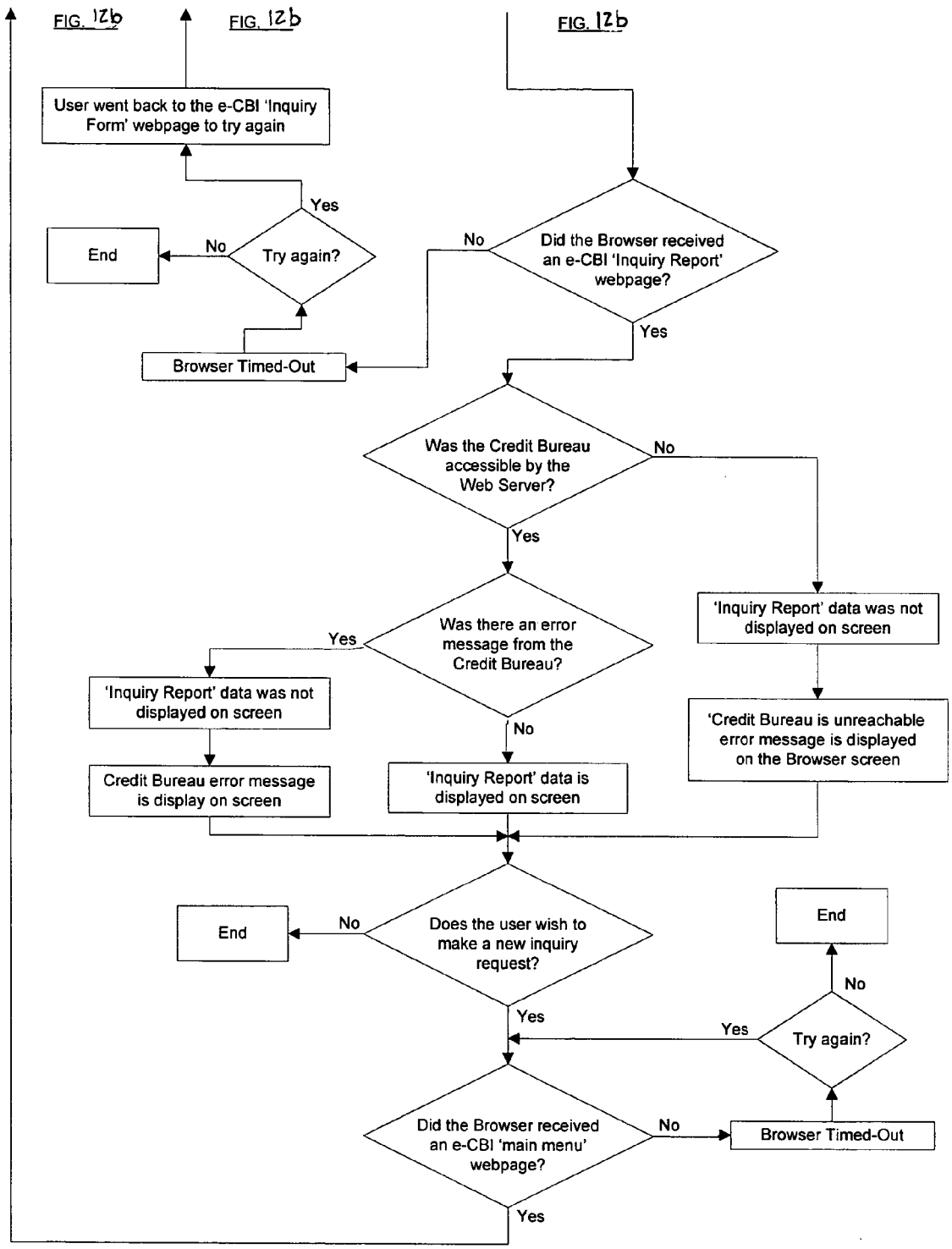
Figures 13A, 13B:
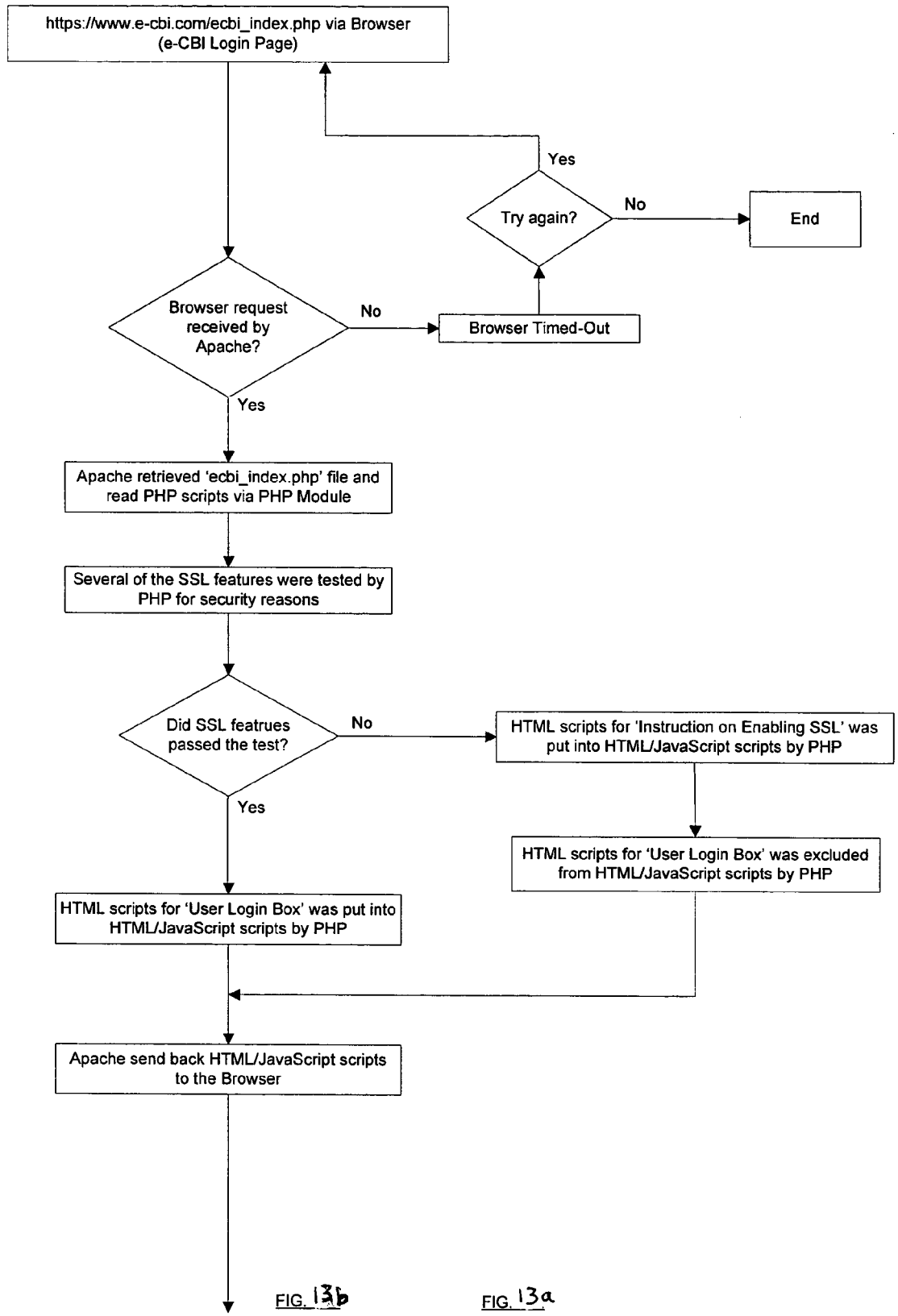
Figure 13I:
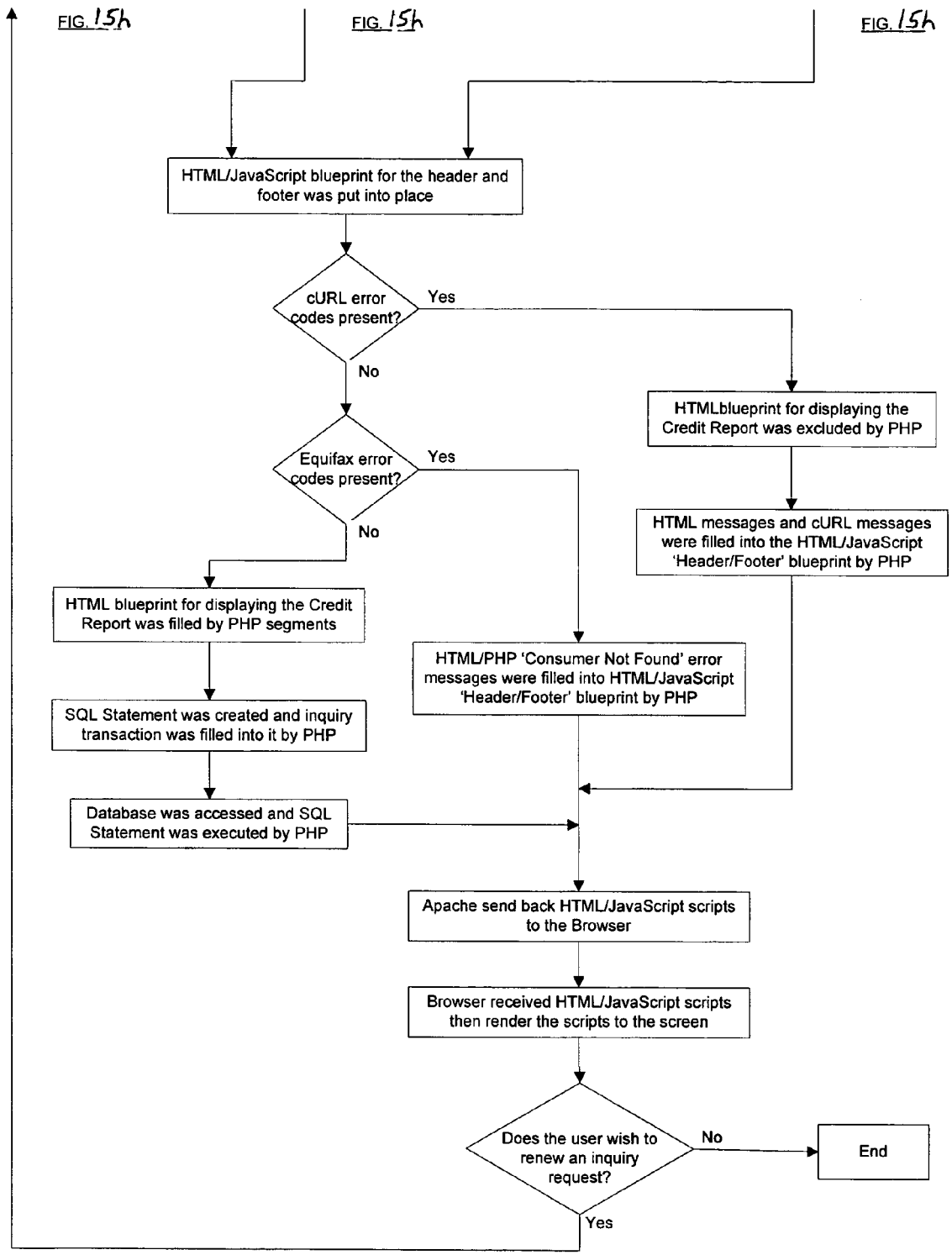

The procedures for providing credit information to a credit bureau 8 are illustrated in FIG. 10. The procedures are similar to the procedures for requesting a credit inquiry, except that the client 6 selects the link for "credit bureau reporting" 150 rather than "credit bureau inquiry" 56, and enters credit report 152 rather than credit inquiry 60 information. In addition, after the web server software 2 decrypts and reformats the data transmitted to it from the client 6, the web server software 2 warehouses the data 154 rather than sending the data immediately to the credit bureau 8. Approximately once a month, the service provider downloads the reports to tape media and forwards the tapes to the appropriate credit bureau 8.

Accordingly, the present invention provides efficient and secure delivery and reporting of personal credit information to and from credit institutions using the Internet. Among the advantages include the ability to use standard web browsers and the web browser-supported format for more easily read and understood credit information.

EXAMPLE

The following example illustrates how a client 6 might use the present invention to request personal credit information pertaining to a potential customer.

Herman would like to purchase a car. Herman drives to his local car dealer and finds a car he likes. He will need financing to purchase the car.

The car dealer is a client of e-CBI. The car salesman, Joe, needs a credit report on Herman to complete the loan application, so he finds an available personal computer (PC) at the dealership. The PCs in the dealership have web browsers with 128-bit SSL encryption capabilities. The PCs also have access to the Internet through the services of a local ISP.

Joe connects to the Internet and uses the web browser to access e-CBI's web site, establishing an http connection to the e-CBI central processing unit (i.e., web server). On the initial screen, Joe selects the link for "members only," initiating an https session. See FIG. 3. On the next screen to appear, Joe selects the link for "credit bureau inquiry" and enters a username and password. See FIG. 4. An inquiry form is displayed to collect the credit information. See FIG. 5. Joe enters credit inquiry data about Herman on the inquiry form, which is in web browser-supported format. Joe also selects a standard type of response from the credit bureau. When Joe completes the form, he clicks the "submit" button on the form. The web browser on Joe's computer encrypts the data and sends it to a at least one web application on e-CBI's server.

The at least one web application decrypts the data. The at least one web application parses the decrypted data, verifying the validity and consistency of the data in this example, the credit bureau to access is pre-selected to be Equifax. Based upon the credit bureau report type entered on the inquiry form, the at least one web application opens a corresponding session definition file (SDF). The at least one web application parses the SDF and inquiry definition file (IDF) and combines the inquiry segment pattern in the IDF with the SDF data and inquiry data from the inquiry form. The data, which is now formatted to meet the credit bureau's requirements, is placed into an input file.

The at least one web application initiates a child (proxy) application, which executes a communications program. The communications program uses data in the session script file to log on to the credit bureau's computer and send the inquiry segment to the credit bureau over a dedicated line. Assuming the credit bureau has credit information concerning Herman and no errors in transmission occur, the credit bureau uses the inquiry segment to pull a credit report, and sends the non-web browser-supported credit report as a report segment back to the child process on the e-CBI server. The child process places the report segment into an output file. Control returns to the parent.

Assuming no communications errors, the at least one web application uses data in the report description file to parse the data in the output file. The at least one web application uses data in the output description file to convert the report segment in the output file to web browser-supported format.

The at least one web application encrypts the output file and sends the result over the internet to Joe's computer, where the data is displayed in Joe's web browser as a credit report for Herman. An example of a credit bureau response is provided in FIGS. 10a–10c. Joe prints a copy of the report, then ends the session with e-CBI and terminates the connection with his ISP. Approximately 10 seconds elapsed from the time Joe submitted the credit information to e-CBI until the report was displayed on his computer screen.

What is claimed is:

1. A computer program product for enabling a computer to transmit a credit bureau inquiry pertaining to a client customer to a credit bureau and receive a response to the inquiry from the credit bureau, said computer program product comprising:
  software instructions for enabling the computer to perform predetermined operations; and
  a computer readable medium bearing the software instructions, the predetermined operations including the steps of:
    (a) displaying the credit bureau inquiry and the credit bureau response in a web browser-supported format,
    (b) directing and controlling the formatting and transmitting of the credit bureau inquiry and credit bureau response between a client terminal and the credit bureau,
    (c) connecting the web browser to said at least one web application via the Internet, thereby facilitating the transfer of the credit bureau inquiry from the web browser to said at least one web application and the transfer of the credit bureau response from said at least one web application to the web browser,
    (d) displaying the credit report in a web browser-supported format,
    (e) formatting and transmitting the credit bureau inquiry and the credit bureau response between the client terminal and the credit bureau, and
    (f) connecting the web browser to said at least one web application via the Internet, thereby facilitating the transfer of the credit bureau report from the web browser to the web application;
  whereby the client is able to send credit information about a client customer electronically to the service provider, the service provider then forwarding the credit information to the credit bureau, providing the ability for the client to generate an on-line credit report for submission to the credit bureau, and
  whereby the client is able to enter the credit report in the web browser of the client terminal in web browser-supported format, rather than using the format required by the credit bureau, providing easier and better understandable entry of the credit information.

2. The system of claim 1, wherein the client terminal further comprises:
  one of an Applet, a plug-in and an Active X that are launchable from the web browser for receiving the credit bureau inquiry and for displaying the credit bureau response on the client terminal.

3. A computer system adapted to transmit a credit bureau inquiry and a credit bureau response between a client and a credit bureau, said computer system comprising:
  a processor;
  a memory including software instructions that cause the computer system to perform the steps of:
    (a) formatting and transmitting the credit bureau inquiry and the credit bureau response between the client terminal and the credit bureau;
    (b) transmitting the credit bureau inquiry from the web browser to the web server software across the Internet;
    (c) receiving the credit bureau inquiry by the web server software;
    (d) converting the credit bureau inquiry, by the web server software, from web browser-supported format to a required credit bureau format;
    (e) receiving the credit bureau response by the web server software;
    (f) converting the credit bureau response, by the web server software, from the credit bureau format to a web browser-supported format;
    (g) transmitting the credit bureau response in a web browser-supported format, from the web server software to the web browser;
    (h) displaying the credit bureau response in the web browser of the client terminal in a web browser-supported format; and
    (i) forwarding a credit report to the credit bureau;
    (j) transmitting the credit report from the web browser to the web server software across the Internet;
    (k) receiving the credit report by the web server software;
    (l) converting the credit report, by the web server software, from the web browser-supported format to a required credit bureau format;
    (m) storing the credit report for approximately 30 days in the computer hardware;
    (n) downloading the stored credit report to a tape medium; and
    (o) forwarding the tape to the credit bureau;
  whereby the client is able to send credit information about a client customer electronically to the service provider, the service provider then forwarding the credit information to the credit bureau, providing the ability for the client to generate an on-line credit report for submission to the credit bureau, and
  whereby the client is able to enter the credit report in the web browser of the client terminal in web browser-supported format, rather than using the format required by the credit bureau, providing easier and better understandable entry of the credit information.

4. The system of claim 3, wherein the client terminal further comprises:
  one of an Applet, a plug-in and an Active X that are launchable from the web browser for receiving the credit bureau inquiry and for displaying the credit bureau response on the client terminal.

* * * * *